United States Patent
Itoh

(10) Patent No.: US 9,794,170 B2
(45) Date of Patent: Oct. 17, 2017

(54) COMMUNICATION METHOD, COMMUNICATION SYSTEM, INFORMATION PROCESSING APPARATUS, COMMUNICATION TERMINAL, AND PROGRAM

(71) Applicant: NEC CORPORATION, Minato-ku, Tokyo (JP)

(72) Inventor: Nobuhiko Itoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/410,512

(22) PCT Filed: Jun. 21, 2013

(86) PCT No.: PCT/JP2013/003902
§ 371 (c)(1),
(2) Date: Dec. 22, 2014

(87) PCT Pub. No.: WO2014/002460
PCT Pub. Date: Jan. 3, 2014

(65) Prior Publication Data
US 2015/0341258 A1 Nov. 26, 2015

(30) Foreign Application Priority Data

Jun. 26, 2012 (JP) ................................. 2012-142809

(51) Int. Cl.
*H04L 12/721* (2013.01)
*H04L 12/851* (2013.01)
(Continued)

(52) U.S. Cl.
CPC .............. *H04L 45/38* (2013.01); *H04L 41/12* (2013.01); *H04L 47/2483* (2013.01);
(Continued)

(58) Field of Classification Search
CPC ......... H04L 45/38; H04L 45/42; H04L 45/04; H04L 47/2483; H04L 47/41; H04L 41/12; Y02B 60/33
(Continued)

(56) References Cited

U.S. PATENT DOCUMENTS 6,865,185 B1 * 3/2005 Patel .................... H04L 47/12
370/310
7,035,259 B2 4/2006 Nomura et al.
(Continued)

FOREIGN PATENT DOCUMENTS

JP 2011-251343 A 9/2001
WO WO 2008/095010 A1 8/2008
(Continued)

OTHER PUBLICATIONS

International Search Report (ISR) (PCT Form PCT/ISA/210), in PCT/JP2013/003902, dated Sep. 17, 2013.
(Continued)

*Primary Examiner* — Stephen J Clawson
(74) *Attorney, Agent, or Firm* — McGinn IP Law Group, PLLC

(57) ABSTRACT

A communication method for identifying a packet flow based on a predetermined rule and processing a packet belonging to the identified packet flow, the communication method includes: setting in a first node a plurality of first rules that identify a plurality of packet flows, respectively; and setting in a second node a second rule that identifies the plurality of packet flows as a group.

19 Claims, 28 Drawing Sheets

(51) Int. Cl.
*H04L 12/891* (2013.01)
*H04L 12/24* (2006.01)
*H04L 12/717* (2013.01)
*H04L 12/715* (2013.01)

(52) U.S. Cl.
CPC .............. *H04L 47/41* (2013.01); *H04L 45/04* (2013.01); *H04L 45/42* (2013.01); *Y02B 60/33* (2013.01)

(58) Field of Classification Search
USPC ........................................................ 370/389
See application file for complete search history.

(56) References Cited

U.S. PATENT DOCUMENTS

| | | | |
|---|---|---|---|
| 8,295,177 B1 | 10/2012 | Bharghavan | |
| 8,755,389 B1 | 6/2014 | Poutievski et al. | |
| 8,780,721 B2 | 7/2014 | Suzuki et al. | |
| 8,830,820 B2 | 9/2014 | Mandal et al. | |
| 2001/0005370 A1 | 6/2001 | Ueno | |
| 2001/0019554 A1 | 9/2001 | Nomura et al. | |
| 2002/0010799 A1* | 1/2002 | Kubota | H04L 29/12009 709/249 |
| 2003/0133411 A1 | 7/2003 | Ise et al. | |
| 2005/0190792 A1* | 9/2005 | Dunk | H04L 45/00 370/469 |
| 2008/0267184 A1 | 10/2008 | Arisoylu et al. | |
| 2011/0273988 A1* | 11/2011 | Tourrilhes | H04L 41/0816 370/237 |
| 2012/0033541 A1 | 2/2012 | Jacob Da Silva et al. | |
| 2012/0113989 A1* | 5/2012 | Akiyoshi | H04L 45/02 370/392 |
| 2012/0140632 A1 | 6/2012 | Norp et al. | |
| 2012/0201140 A1 | 8/2012 | Suzuki et al. | |
| 2013/0064243 A1* | 3/2013 | Akiyoshi | H04L 45/38 370/389 |
| 2013/0148666 A1* | 6/2013 | Shimonishi | H04L 45/72 370/400 |
| 2013/0177016 A1 | 7/2013 | Nakano et al. | |
| 2014/0089506 A1* | 3/2014 | Puttaswamy Naga | H04L 45/42 709/225 |
| 2015/0131666 A1* | 5/2015 | Kang | H04L 45/745 370/392 |
| 2015/0341258 A1 | 11/2015 | Itoh | |

FOREIGN PATENT DOCUMENTS

| | | |
|---|---|---|
| WO | WO 2011/043312 A1 | 4/2011 |
| WO | WO 2012/053540 A1 | 4/2012 |

OTHER PUBLICATIONS

Jon Matias et al., "An OpenFlow Based Network Virtualization Framework for the Cloud" 2011, Third IEEE International Conference on Cloud Computing Technology and Science, pp. 672-678.
United States Office Action dated Mar. 3, 2016 in co-pending U.S. Appl. No. 14/408,932.
Extended European Search Report dated Jan. 29, 2016.
United States Notice of Allowance dated Jul. 8, 2016 in U.S. Appl. No. 14/408,932.
Chinese Office Action dated Sep. 29, 2016, with an English translation.
Chinese Office Action dated Jun. 8, 2017, with an English translation.
Nick McKeown, et al., "OpenFlow: Enabling Innovation in Campus Networks", ACM Sigcomm Computer Review, Mar. 14, 2008, pp. 1-6.
"Open Networking Foundation, OpenFlow Switch Specification", Version 1.1.0 Implemented (VVire Protocol 0x02), Feb. 28, 2011, pp. 1-58.

* cited by examiner

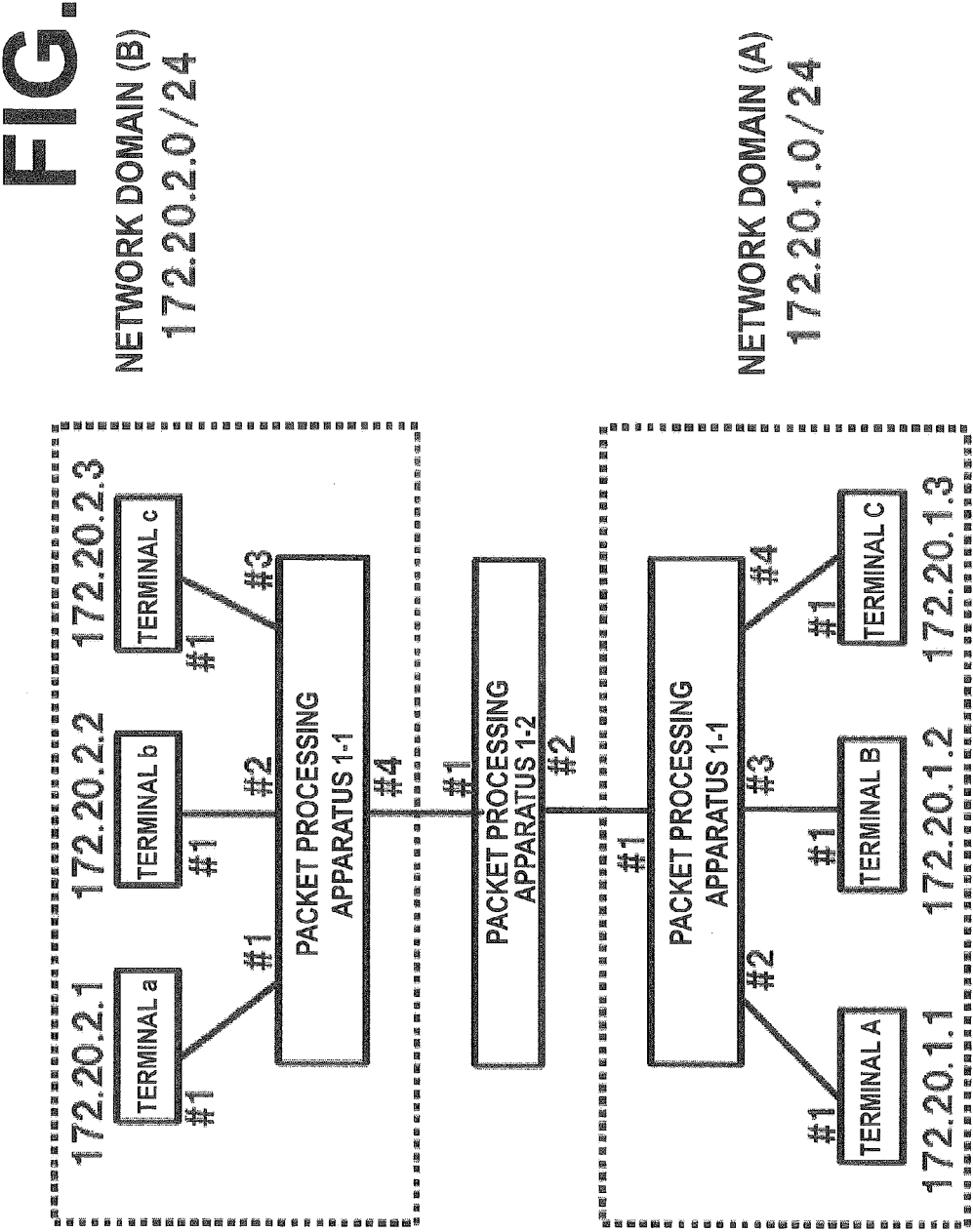

FIG. 7

PROCESSING RULES IN PACKET PROCESSING APPARATUS 1-1 IN DOMAIN (A)

| IDENTIFICATION RULE | PROCESSING METHOD |
|---|---|
| SOURCE IP : 172.20.1.3<br>DESTINATION IP : 172.20.2.3 | FORWARD FROM PORT#1 |
| SOURCE IP : 172.20.1.2<br>DESTINATION IP : 172.20.2.2 | FORWARD FROM PORT#1 |

PROCESSING RULE IN PACKET PROCESSING APPARATUS 1-2

| IDENTIFICATION RULE | PROCESSING METHOD |
|---|---|
| SOURCE IP : 172.20.1.0/24<br>DESTINATION IP : 172.20.2.0/24 | FORWARD FROM PORT#1 |

PROCESSING RULES IN PACKET PROCESSING APPARATUS 1-1 IN DOMAIN (B)

| IDENTIFICATION RULE | PROCESSING METHOD |
|---|---|
| SOURCE IP : 172.20.1.3<br>DESTINATION IP : 172.20.2.3 | FORWARD FROM PORT#3 |
| SOURCE IP : 172.20.1.2<br>DESTINATION IP : 172.20.2.2 | FORWARD FROM PORT#2 |

FIG. 9

PROCESSING RULE IN PACKET PROCESSING APPARATUS 1-2

| IDENTIFICATION RULE | PROCESSING METHOD |
|---|---|
| SOURCE IP : 172.20.1.0/24 or 172.20.3.0/24<br>DESTINATION IP : 172.20.2.0/24 | FORWARD FROM PORT#2 |

FIG. 11

PROCESSING RULE IN PACKET PROCESSING APPARATUS 1-1 IN DOMAIN (A)

| IDENTIFICATION RULE | PROCESSING METHOD |
|---|---|
| SOURCE IP : 172.20.1.0/24<br>DESTINATION IP : 172.20.2.0/24 | FORWARD FROM PORT#5 |

PROCESSING RULE IN PACKET PROCESSING APPARATUS 1-1 IN DOMAIN (C)

| IDENTIFICATION RULE | PROCESSING METHOD |
|---|---|
| SOURCE IP : 172.20.1.0/24<br>DESTINATION IP : 172.20.2.0/24 | FORWARD FROM PORT#1 |

PROCESSING RULE IN PACKET PROCESSING APPARATUS 1-3

| IDENTIFICATION RULE | PROCESSING METHOD |
|---|---|
| SOURCE IP : 172.20.1.0/24<br>DESTINATION IP : 172.20.2.0/24 | FORWARD FROM PORT#1 |

NO CHANGE IN PACKET PROCESSING APPARATUS 1-1 IN DOMAIN (B)

FIG. 13

SETTINGS OF PROCESSING RULES BEFORE MIGRATION OF VMS

PROCESSING RULE IN PACKET PROCESSING APPARATUS 1-2

| IDENTIFICATION RULE | PROCESSING METHOD |
|---|---|
| SOURCE IP : 172.20.1.0/24<br>DESTINATION IP : 172.20.2.0/24 | FORWARD FROM PORT#2 |

PROCESSING RULE IN PACKET PROCESSING APPARATUS 1-1 IN DOMAIN (B)

| IDENTIFICATION RULE | PROCESSING METHOD |
|---|---|
| SOURCE IP : 172.20.1.1<br>DESTINATION IP : 172.20.2.1 | FORWARD FROM PORT#1 |

FIG. 14

PROCESSING RULE IN PACKET PROCESSING APPARATUS 1-2

| IDENTIFICATION RULE | PROCESSING METHOD |
|---|---|
| SOURCE IP : 172.20.1.0/24<br>DESTINATION IP : 172.20.3.0/24 | FORWARD FROM PORT#2 |

PROCESSING RULE IN PACKET PROCESSING APPARATUS 1-1 IN DOMAIN (B)

| IDENTIFICATION RULE | PROCESSING METHOD |
|---|---|
| SOURCE IP : 172.20.1.0/24<br>DESTINATION IP : 172.20.3.0/24 | FORWARD FROM PORT#4 |

PROCESSING RULE IN PACKET PROCESSING APPARATUS 1-3

| IDENTIFICATION RULE | PROCESSING METHOD |
|---|---|
| SOURCE IP : 172.20.1.0/24<br>DESTINATION IP : 172.20.3.0/24 | FORWARD FROM PORT#2 |

PROCESSING RULE IN PACKET PROCESSING APPARATUS 1-1 IN DOMAIN (C)

| IDENTIFICATION RULE | PROCESSING METHOD |
|---|---|
| SOURCE IP : 172.20.1.1<br>DESTINATION IP : 172.20.3.1 | FORWARD FROM PORT#1 |

FIG. 16

PROCESSING RULES IN CORE NODE 42

| IDENTIFICATION RULE | PROCESSING METHOD |
|---|---|
| SOURCE IP : 172.20.1.0/24<br>DESTINATION IP: 172.20.3.0/24 | FORWARD FROM PREDETERMINED PORT |
| SOURCE IP : 172.20.2.0/24<br>DESTINATION IP: 172.20.3.0/24 | FORWARD FROM PREDETERMINED PORT |
| SOURCE IP : 172.20.1.0/24<br>DESTINATION IP: 172.20.2.0/24 | FORWARD FROM PREDETERMINED PORT |
| SOURCE IP : 172.20.2.0/24<br>DESTINATION IP: 172.20.1.0/24 | FORWARD FROM PREDETERMINED PORT |

FIG. 19

PROCESSING RULES IN PACKET FORWARDING FUNCTION UNIT 503

| IDENTIFICATION RULE | PROCESSING METHOD |
|---|---|
| APPLICATION : Web<br>DESTINATION : WildCard | FORWARD FROM PORT CORRESPONDING TO LTE INTERFACE |
| APPLICATION : MAIL (IMAP) | FORWARD TO PORT CORRESPONDING TO MAIL APPLICATION |
| APPLICATION : Web<br>COMMUNICATION<br>DESTINATION : TERMINAL 5 | FORWARD TO PORT CORRESPONDING TO WEB APPLICATION |

FIG. 20

PROCESSING RULES IN EDGE NODE 41(A)

| IDENTIFICATION RULE | PROCESSING METHOD |
|---|---|
| SOURCE ADDRESS : COMMUNICATION TERMINAL 5<br>APPLICATION : WEB OR MAIL | FORWARD FROM PREDETERMINED PORT |
| DESTINATION ADDRESS : COMMUNICATION TERMINAL 5<br>APPLICATION : WEB OR MAIL | FORWARD FROM PREDETERMINED PORT |

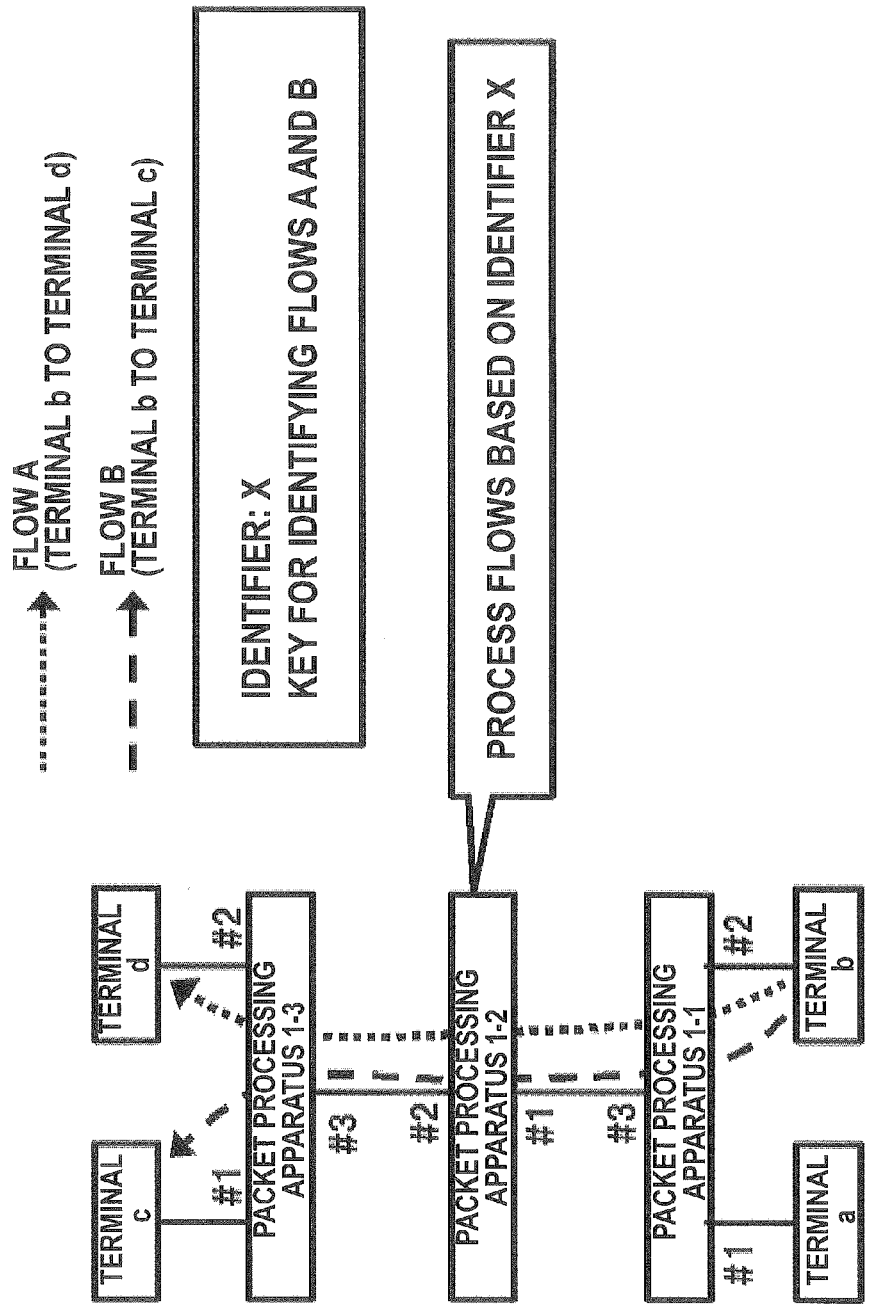

FIG. 22

PROCESSING RULES IN PACKET PROCESSING APPARATUS 1-1

| IDENTIFICATION RULE | PROCESSING METHOD |
|---|---|
| SOURCE : TERMINAL b<br>DESTINATION : TERMINAL d | · ADD IDENTIFIER X TO PACKET<br>· FORWARD FROM PORT#3 |
| SOURCE : TERMINAL b<br>DESTINATION : TERMINAL c | · ADD IDENTIFIER X TO PACKET<br>· FORWARD FROM PORT#3 |

PROCESSING RULE IN PACKET PROCESSING APPARATUS 1-2

| IDENTIFICATION RULE | PROCESSING METHOD |
|---|---|
| IDENTIFIER : X | FORWARD FROM PORT#2 |

PROCESSING RULES IN PACKET PROCESSING APPARATUS 1-3

| IDENTIFICATION RULE | PROCESSING METHOD |
|---|---|
| SOURCE : TERMINAL b<br>DESTINATION : TERMINAL d | · DELETE IDENTIFIER X FROM PACKET<br>· FORWARD FROM PORT#2 |
| SOURCE : TERMINAL b<br>DESTINATION : TERMINAL c | · DELETE IDENTIFIER X FROM PACKET<br>· FORWARD FROM PORT#1 |

FIG. 23

PROCESSING RULES IN PACKET PROCESSING APPARATUS 1-1

| IDENTIFICATION RULE | PROCESSING METHOD |
|---|---|
| SOURCE : TERMINAL b<br>DESTINATION : TERMINAL d | • CONVERT PREDETERMINED REGION OF PACKET TO IDENTIFIER X<br>• FORWARD FROM PORT#3 |
| SOURCE : TERMINAL b<br>DESTINATION : TERMINAL c | • CONVERT PREDETERMINED REGION OF PACKET TO IDENTIFIER X<br>• FORWARD FROM PORT#3 |

PROCESSING RULE IN PACKET PROCESSING APPARATUS 1-2

| IDENTIFICATION RULE | PROCESSING METHOD |
|---|---|
| IDENTIFIER : X | FORWARD FROM PORT#2 |

PROCESSING RULES IN PACKET PROCESSING APPARATUS 1-3

| IDENTIFICATION RULE | PROCESSING METHOD |
|---|---|
| SOURCE : TERMINAL b<br>DESTINATION : TERMINAL d | • RECOVER REGION CONVERTED TO IDENTIFIER X TO ORIGINAL CONTENT<br>• FORWARD FROM PORT#2 |
| SOURCE : TERMINAL b<br>DESTINATION : TERMINAL c | • RECOVER REGION CONVERTED TO IDENTIFIER X TO ORIGINAL CONTENT<br>• FORWARD FROM PORT#1 |

FIG. 28

PROCESSING RULES IN PACKET PROCESSING APPARATUS 1 CONNECTED TO VM (C) AND VM (D)

| IDENTIFICATION RULE | PROCESSING METHOD |
|---|---|
| SOURCE : VM(D)<br>DESTINATION : VM(A) | · ADD IDENTIFIER X TO PACKET<br>· FORWARD FROM PREDETERMINED PORT |
| SOURCE : VM(C)<br>DESTINATION : VM(B) | · ADD IDENTIFIER X TO PACKET<br>· FORWARD FROM PREDETERMINED PORT |

PROCESSING RULE IN PACKET PROCESSING APPARATUS 100

| IDENTIFICATION RULE | PROCESSING METHOD |
|---|---|
| IDENTIFIER : X | FORWARD FROM PREDETERMINED PORT |

PROCESSING RULES IN PACKET PROCESSING APPARATUS 1 CONNECTED

| IDENTIFICATION RULE | PROCESSING METHOD |
|---|---|
| SOURCE : VM(D)<br>DESTINATION : VM(A) | · DELETE IDENTIFIER X FROM PACKET<br>· FORWARD TO VM (A) |
| SOURCE : VM(C)<br>DESTINATION : VM(B) | · DELETE IDENTIFIER X FROM PACKET<br>· FORWARD TO VM (B) |

COMMUNICATION METHOD, COMMUNICATION SYSTEM, INFORMATION PROCESSING APPARATUS, COMMUNICATION TERMINAL, AND PROGRAM

TECHNICAL FIELD

Cross-Reference to Related Applications

The present invention is based upon and claims the benefit of the priority of Japanese Patent Application No. 2012-142809, filed on Jun. 26, 2012, the disclosure of which is incorporated herein in its entirety by reference thereto.

The present invention relates to a communication method, a communication system, an information processing apparatus, a communication terminal, and a program. It relates to a communication method, a communication system, an information processing apparatus, a communication terminal, and a program for identifying a packet flow and processing a packet belonging to the identified packet flow.

BACKGROUND

Patent literature (PTL) 1 discloses a technique in which a communication apparatus such as a switch identifies a packet flow and processes packets based on information (Flow Entry) for processing a packet belonging to the identified flow.

According to the technique disclosed in PTL 1, the communication apparatus stores a plurality of flow entries corresponding to a plurality of packet flows, respectively.
PTL 1:
International Publication No. 2008/095010

SUMMARY

The entire disclosure of PTL 1 is incorporated herein by reference thereto. If a communication apparatus is configured to store flow processing information per packet flow, the communication apparatus needs to store an excessively large amount of information. As a result, a storage region such as a memory of the communication apparatus is exhausted, counted as a problem.

Therefore, there is a need in the art to reduce the amount of information used for processing packet flows.

Solution to Problem

According to a first aspect of the present invention, there is provided a communication method for identifying a packet flow(s) based on a predetermined rule(s) and processing a packet(s) belonging to the identified packet flow(s), the communication method comprising:
setting in a first node a plurality of first rules that identify a plurality of packet flows, respectively; and
setting in a second node a second rule that identifies the plurality of packet flows as a group.

According to a second aspect of the present invention, there is provided a communication system for identifying a packet flow(s) based on a predetermined rule(s) and processing a packet(s) belonging to the identified packet flow(s), the communication system comprising:
a first unit that sets in a first node a plurality of first rules that identify a plurality of packet flows, respectively; and
a second unit that sets in a second node a second rule that identifies the plurality of packet flows as a group.

According to a third aspect of the present invention, there is provided an information processing apparatus controlling nodes identifying a packet flow(s) based on a predetermined rule(s) and processing a packet(s) belonging to the identified packet flow(s), the information processing apparatus comprising:
a first unit that sets in a first node a plurality of first rules that identify a plurality of packet flows, respectively; and
a second unit that sets in a second node a second rule that identifies the plurality of packet flows as a group.

According to a fourth aspect of the present invention, there is provided a communication terminal identifying a packet flow(s) based on a predetermined rule(s) and processing a packet(s) belonging to the identified packet flow(s), the communication terminal comprising:
a first unit that receives a plurality of first rules that identify a plurality of packet flows, respectively; and
a second unit that transmits in accordance with the first rules a packet through a second node, in which a second rule that identifies the plurality of packet flows as a group is set.

According to a fifth aspect of the present invention, there is provided a program, causing an information processing apparatus controlling a node that identifies a packet flow(s) based on a predetermined rule(s) and processes a packet(s) belonging to the identified packet flow(s), to execute:
setting in a first node a plurality of first rules that identify a plurality of packet flows, respectively; and
setting in a second node a second rule that identifies the plurality of packet flows as a group.

The present invention provides the following advantage, but not restricted thereto. According to a communication method, a communication system, an information processing apparatus, a communication terminal, and a program of the present invention, the amount of information stored in a communication apparatus for processing packet flows can be reduced.

BRIEF DESCRIPTION OF THE DRAWINGS

FIG. 6 illustrates a configuration of a system according to a second exemplary embodiment.
FIG. 7 illustrates processing rules according to the second exemplary embodiment.
FIG. 9 illustrates a processing rule according to the second exemplary embodiment.
FIG. 11 illustrates processing rules according to the second exemplary embodiment.
FIG. 13 illustrates processing rules according to the third exemplary embodiment.

FIG. 14 illustrates processing rules according to the third exemplary embodiment.

FIG. 16 illustrates processing rules according to the fourth exemplary embodiment.

FIG. 19 illustrates processing rules according to the fifth exemplary embodiment.

FIG. 20 illustrates processing rules according to the fifth exemplary embodiment.

FIG. 21 illustrates a configuration of a system according to a sixth exemplary embodiment.

FIG. 22 illustrates processing rules according to the sixth exemplary embodiment.

FIG. 23 illustrates processing rules according to the sixth exemplary embodiment.

FIG. 28 illustrates an operation according to the eighth exemplary embodiment.

PREFERRED MODES

In the present disclosure, there are various possible modes, which include the following, but not restricted thereto.

<First Exemplary Embodiment>

Figure 1:
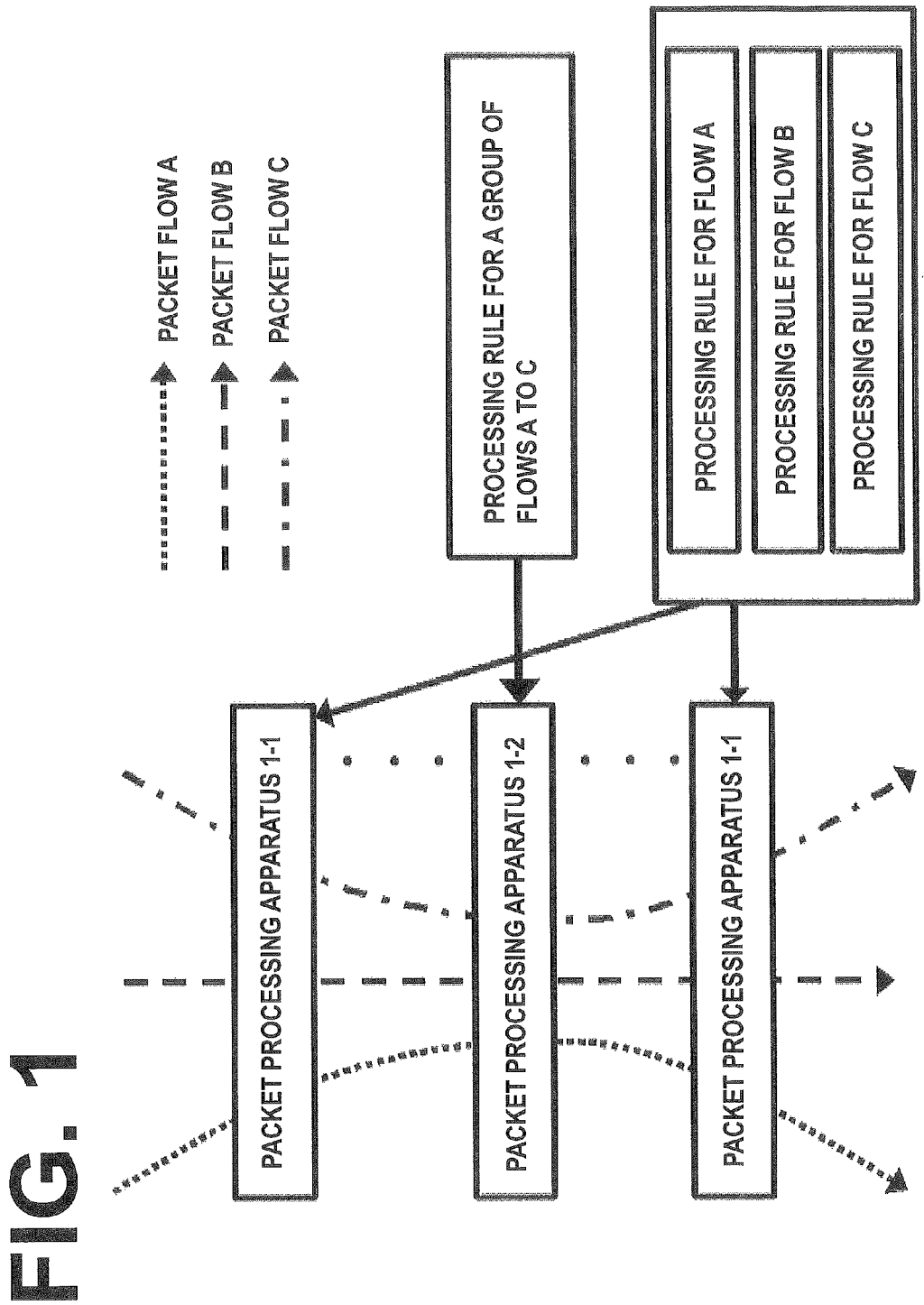
FIG. 1 illustrates a configuration according to a first exemplary embodiment.

FIG. 1 illustrates a configuration according to a first exemplary embodiment. In the first exemplary embodiment, since a packet processing apparatus can operate in accordance with a processing rule for identifying a plurality of packet flows as a group, an increase in the number of processing rules set in the packet processing apparatus can be prevented.

A packet flow refers to a series of packets that can be identified by a predetermined condition defined based on a packet content (information about the source and destination of a packet or a combination of a plurality of items of information included in a packet, for example). If packets have different identification conditions from each other, these packets belong to different packet flows, respectively.

FIG. 1 illustrates a communication system including a plurality of packet processing apparatuses 1 (packet processing apparatuses 1-1 and a packet processing apparatus 1-2). The packet processing apparatuses 1 are nodes on a network. Each of the packet processing apparatuses 1-1 stores a plurality of processing rules corresponding to a plurality of packet flows (packet flows A to C), respectively.

In accordance with the plurality of processing rules, each packet processing apparatus 1-1 identifies the packet flows individually and processes the packets belonging to the identified flows. Each processing rule set in a packet processing apparatus 1-1 defines a processing method for each of the packets belonging to a packet flow, for example.

The packet processing apparatus 1-2 stores a processing rule for identifying a plurality of packet flows as a group. In accordance with a set processing rule, the packet processing apparatus 1-2 collectively identifies a plurality of packet flows and processes the packets belonging to the identified plurality of flows. The processing rule set in the packet processing apparatus 1-2 defines a common processing method for each of the packets belonging to a plurality of packet flows, for example. The packet processing apparatus 1-2 processes each of the packets belonging to a plurality of packet flows, in accordance with a common processing method defining a processing rule, for example.

The packet processing apparatus 1-2 has a smaller number of processing rules set therein than that set in a packet processing apparatus 1-1. Thus, the number of processing rules that need to be stored in the entire communication system is reduced.

Figure 2:
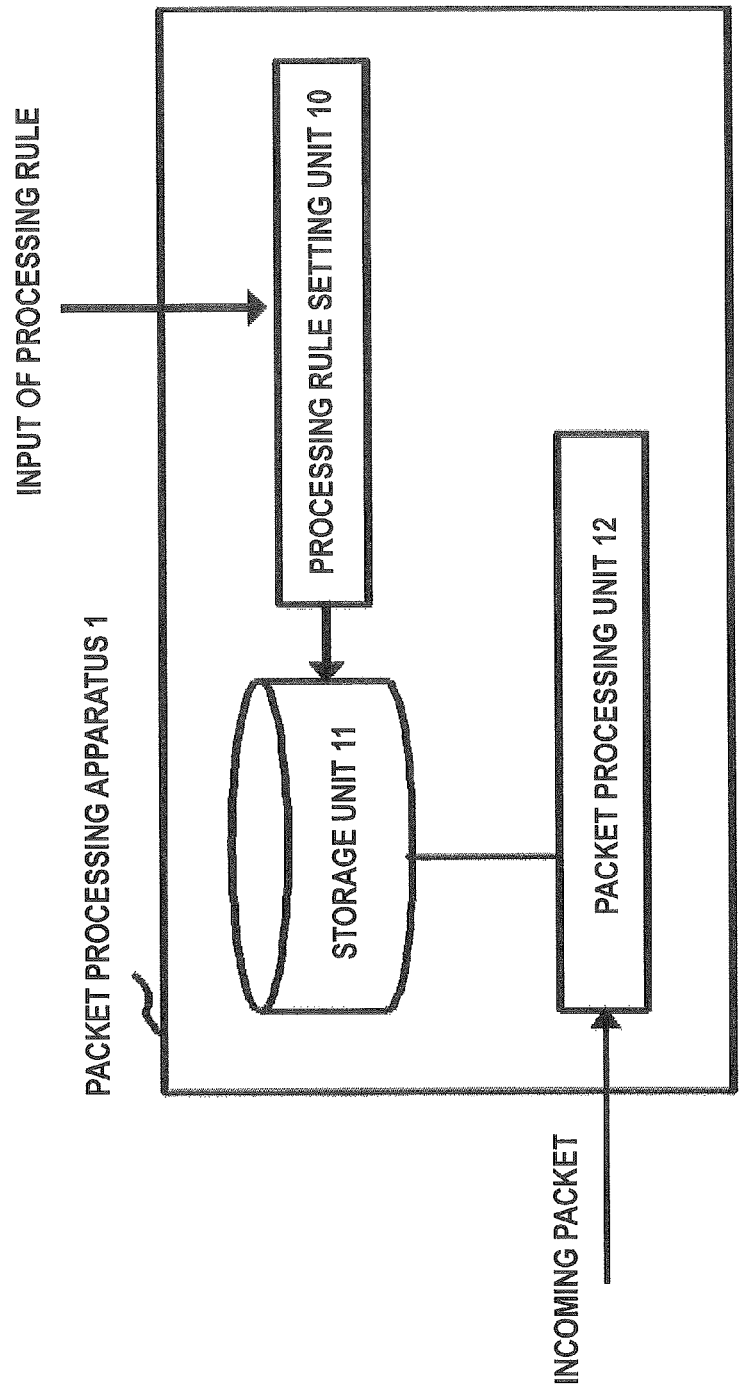
FIG. 2 illustrates a configuration of a packet processing apparatus.

FIG. 2 illustrates a configuration of a packet processing apparatus 1. The packet processing apparatus 1 includes a processing rule setting unit 10, a storage unit 11, and a packet processing unit 12.

The packet processing apparatus 1 is a switch or a router, for example. Alternatively, the packet processing apparatus 1 may be a virtual switch that operates as software on a server, for example.

The processing rule setting unit 10 sets processing rules inputted from the outside in the storage unit 11.

The storage unit 11 stores these processing rules set by the processing rule setting unit 10.

The packet processing unit 12 searches the processing rules stored in the storage unit 11 for a processing rule corresponding to an incoming packet. The packet processing unit 12 processes the incoming packet, in accordance with the retrieved processing rule.

Figure 3:
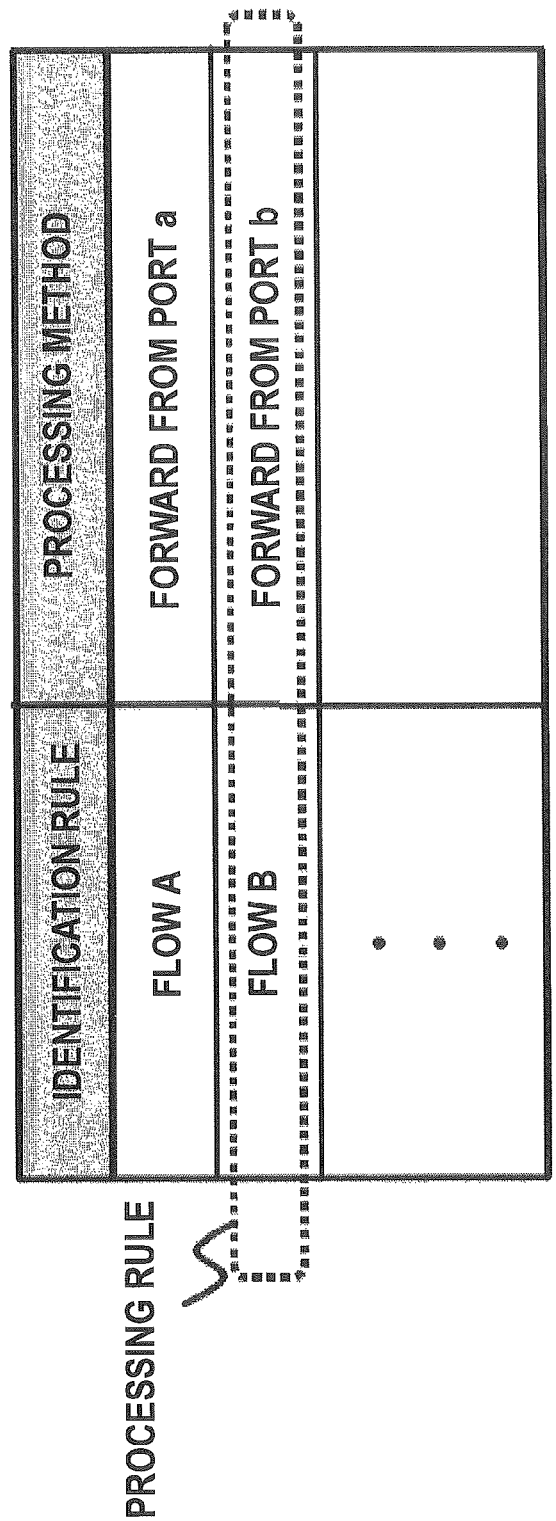
FIG. 3 illustrates processing rules stored in the packet processing apparatus.

FIG. 3 illustrates processing rules stored in the storage unit 11.

For example, each of the processing rules includes an identification rule for identifying a packet flow to which a packet received by the packet processing apparatus 1 belongs and a processing method for the packet belonging to the flow. The identification rule is a rule defined based on information included in a packet, for example. For example, as a condition for identifying a packet flow, an identification rule defines a rule that "the destination represents address A and the source represents address B." If the destination of an incoming packet represents address A and the source represents address B, the incoming packet is determined to belong to a packet flow corresponding to this identification rule.

To identify a plurality of packet flows as a group, an identification rule defines a rule that encompasses rules for identifying a plurality of packet flows. For example, such identification rule defines a rule that "the source address is address A or B and the destination address is address C or D." Based on this identification rule, the packet processing apparatus 1 can identify a packet flow in which the source represents address A and the destination represents address C and a packet flow in which the source represents address B and the destination represents address D as a group.

The packet processing unit 12 refers to an identification rule of a processing rule stored in the storage unit 11 and determines a packet flow to which an incoming packet belongs. For example, if an incoming packet matches an identification condition corresponding to flow B in FIG. 3, the packet processing unit 12 processes the incoming packet in accordance with a processing method defined in a processing rule corresponding to flow B. For example, the processing method defines packet forwarding from a predetermined port of the packet processing apparatus 1.

Figure 4:
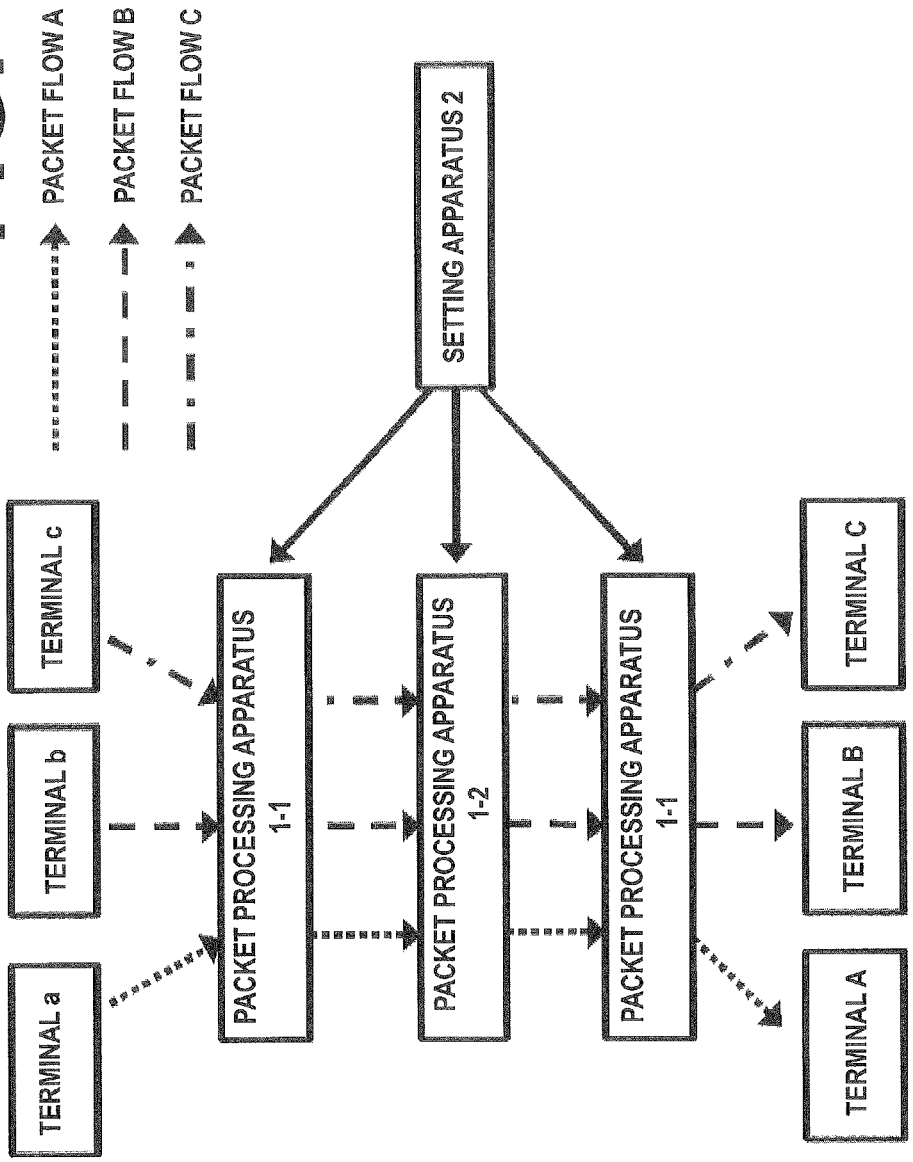
FIG. 4 illustrates a configuration of a system according to the first exemplary embodiment.

FIG. 4 illustrates a configuration of a system according to the first exemplary embodiment.

The system according to the first exemplary embodiment includes a plurality of terminals (terminals a to c and terminals A to C), a plurality of packet processing apparatuses 1, and a setting apparatus 2.

In FIG. 4, communication from the terminal a to the terminal A will be referred to as packet flow A, communication from the terminal b to the terminal B as packet flow B, and communication from the terminal c to the terminal C as packet flow C.

In FIG. 4, these packet flows transmitted from the respective terminals a to c travel through a packet processing apparatus 1-1 and are gathered into a path at the packet processing apparatus 1-2. For example, as illustrated in FIG. 4, by setting a processing rule for identifying a plurality of packet flows as a group in the packet processing apparatus where a plurality of packet flows are gathered into a path, the number of processing rules can be effectively reduced.

The setting apparatus 2 is an apparatus for setting processing rules in the packet processing apparatuses 1. For example, the setting apparatus 2 is a console used by an operator of the system to input settings to the packet processing apparatuses 1. Alternatively, for example, the setting apparatus 2 may be an apparatus for managing packet forwarding processing of the plurality of packet processing apparatuses 1 in a centralized manner and for setting processing rules in each of the packet processing apparatuses 1.

The setting apparatus 2 sets a plurality of processing rules corresponding to a plurality of packet flows (packet flows A to C), respectively, in the packet processing apparatuses 1-1. The setting apparatus 2 sets a processing rule for identifying a plurality of packet flows as a group in the packet processing apparatus 1-2. A plurality of setting apparatuses 2 may be arranged in the system. For example, a setting apparatus 2 for setting a plurality of processing rules corresponding to a plurality of packet flows, respectively, and a setting apparatus 2 for setting a processing rule for identifying a plurality of packet flows as a group may be arranged.

Figure 5:
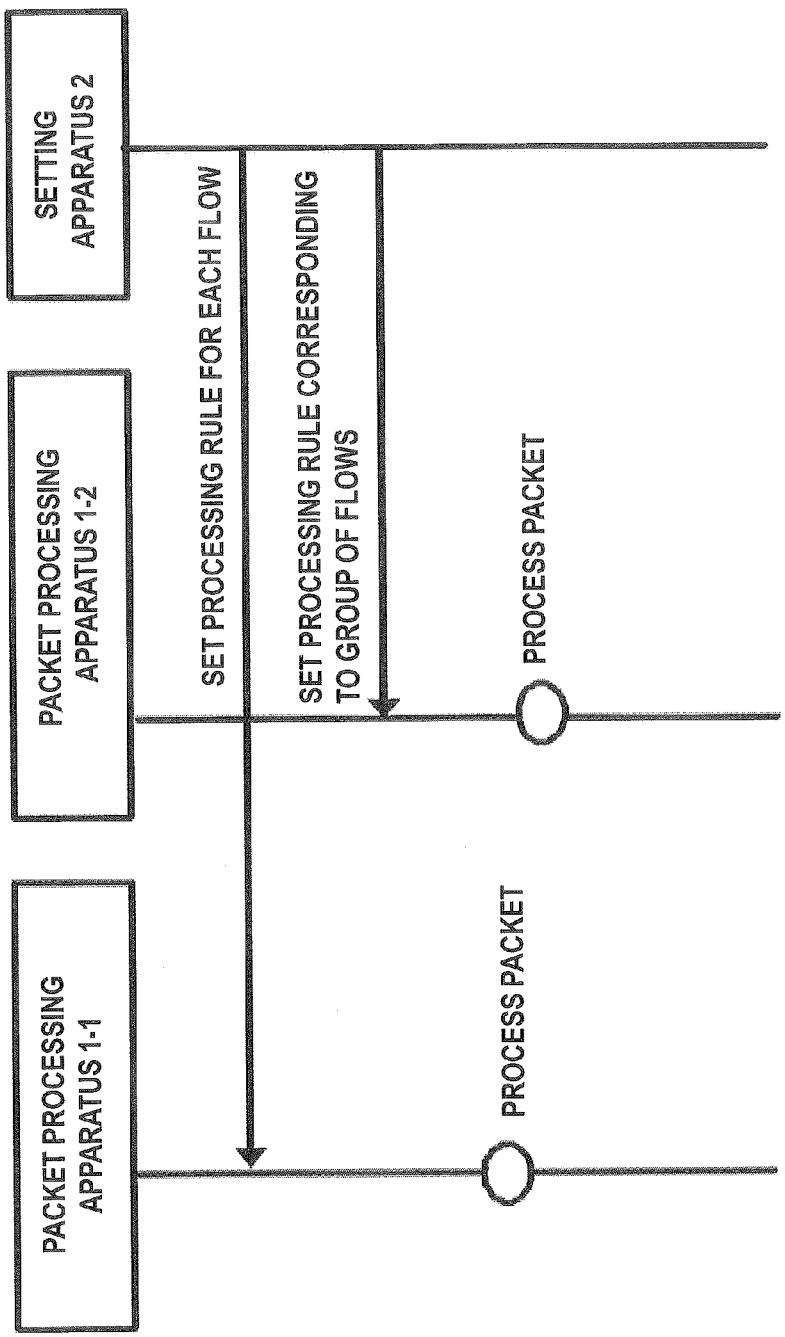
FIG. 5 illustrates an operation according to the first exemplary embodiment.

FIG. 5 illustrates an operation according to the first exemplary embodiment.

The setting apparatus 2 sets a plurality of processing rules corresponding to a plurality of packet flows, respectively, in a packet processing apparatus 1-1.

The setting apparatus 2 sets a processing rule for identifying a plurality of packet flows as a group in the packet processing apparatus 1-2.

The packet processing apparatuses 1-1 and 1-2 process packets in accordance with the processing rules set in the respective packet processing apparatuses 1-1 and 1-2.

According to the first exemplary embodiment, since a packet processing apparatus 1 processes packets in accordance with a processing rule for identifying a plurality of packet flows as a group, the number of processing rules set in the packet processing apparatus 1 can be reduced.

<Second Exemplary Embodiment>

According to a second exemplary embodiment, a packet processing apparatus 1 identifies packet flows transmitted between network domains or packet flows transmitted between sites such as offices or data centers as a group.

FIG. 6 illustrates a configuration of a system according to the second exemplary embodiment.

Network domains (A) and (B) are connected by a packet processing apparatus 1-2. These network domains (A) and (B) may exist in different sites (offices, data centers, etc.) or in the same site.

A packet processing apparatus 1-1 in the network domain (A) is connected to terminals A to C. The terminals A to C are connected to respective ports (port numbers 2 to 4) of the packet processing apparatus 1-1. The terminals A to C have addresses 172.20.1.1, 172.20.1.2, and 172.20.1.3, respectively.

The network address of the network domain (A) is

A packet processing apparatus 1-1 in the network domain (B) is connected to terminals a to c. The terminals a to c are connected to respective ports (port numbers 1 to 3) of the packet processing apparatus 1-1. The terminals a to c have addresses 172.20.2.1, 172.20.2.2, and 172.20.2.3, respectively.

FIG. 7 illustrates processing rules set in the respective packet processing apparatuses 1. FIG. 7 illustrates processing rules set in the respective packet processing apparatuses 1 for processing a packet flow transmitted from the terminal B to the terminal b and a packet flow transmitted from the terminal C to the terminal c.

The packet processing apparatus 1-2 includes a processing rule for identifying the packet flow transmitted from the terminal B to the terminal b and the packet flow transmitted from the terminal C to the terminal c based on network addresses. In accordance with this processing rule, the packet processing apparatus 1-2 identifies the packet flows transmitted from the terminals in the network domain (A) to the terminals in the network domain (B) as a group. When packets are transmitted from terminals in the domain (A) to terminals in the domain (B), the source network address represents 172.20.1.0/24 and the destination network address represents 172.20.2.0/24. Thus, the packet processing apparatus 1-2 can identify a plurality of packet flows transmitted from terminals in the domain (A) to terminals in the domain (B) based on the processing rule illustrated in FIG. 7. These processing rules illustrated in FIG. 7 may include an identification rule for identifying a flow based on a network address and a packet protocol (UDP (User Datagram Protocol), TCP (Transmission Control Protocol), etc.).

In the system configuration in FIG. 6, packet flows between the domains (A) and (B) travel through the packet processing apparatus 1-2. By setting a processing rule for identifying a flow based on network addresses in a packet processing apparatus 1 such as the packet processing apparatus 1-2 arranged on a path where a plurality of packet flows are gathered, the number of processing rules can be reduced.

A packet processing apparatus 1 may process packet flows based on a processing rule for identifying packet flows from a plurality of domains as a group.

Figure 8:
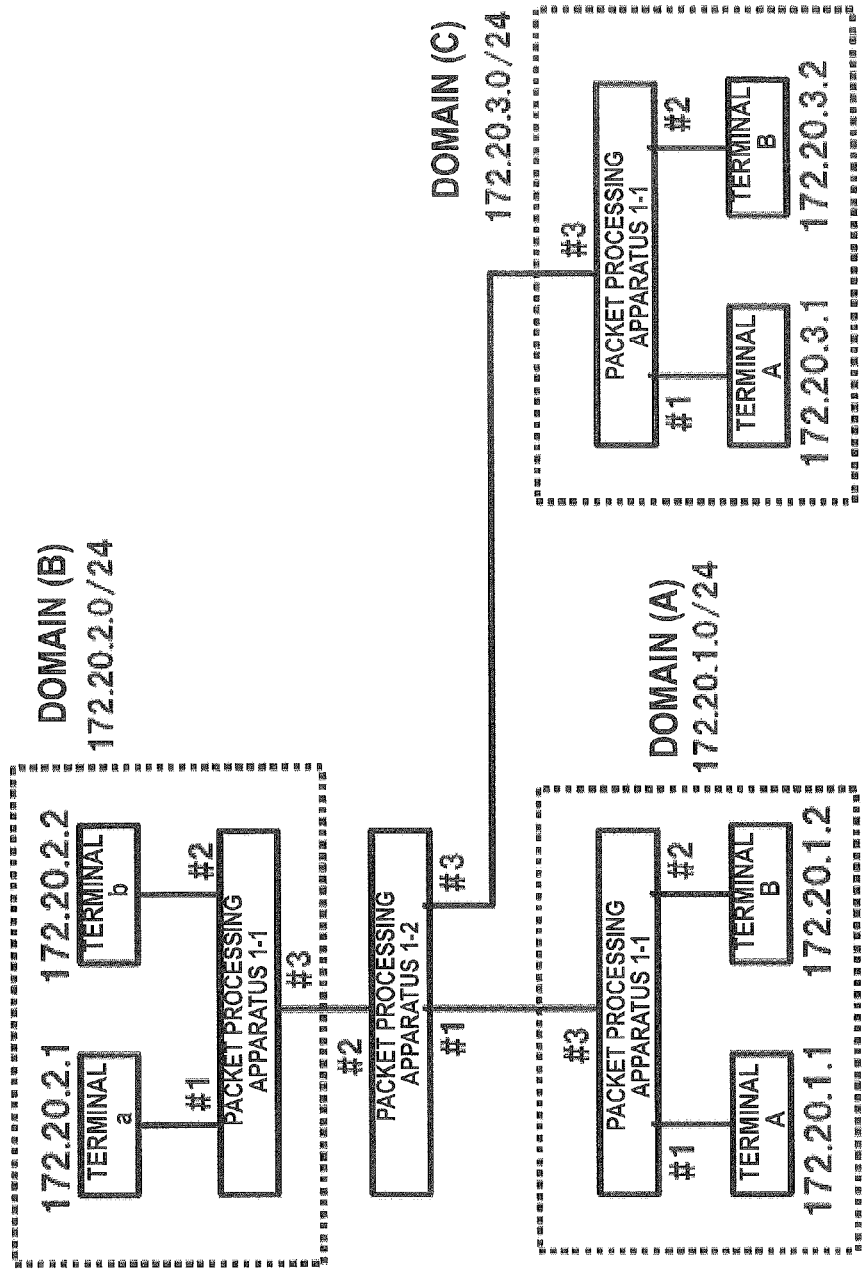
FIG. 8 illustrates a configuration of the system according to the second exemplary embodiment.

FIG. 8 illustrates a configuration of a system in which packet flows from a plurality of domains are gathered at the packet processing apparatus 1-2.

Packet flows transmitted from the domain (A) or (C) to the domain (B) are gathered at the packet processing apparatus 1-2.

The packet processing apparatus 1-2 includes a processing rule illustrated in FIG. 9, as a processing rule for processing packet flows transmitted from the domain (A) or (C) to the domain (B).

The processing rule illustrated in FIG. 9 includes an identification rule for identifying packet flows transmitted from the domain (A) or (C) to the domain (B) as a group.

By setting a processing rule for identifying packet flows transmitted from a plurality of domains as a group in a packet processing apparatus 1, the number of processing rules can be further reduced.

Figure 10:
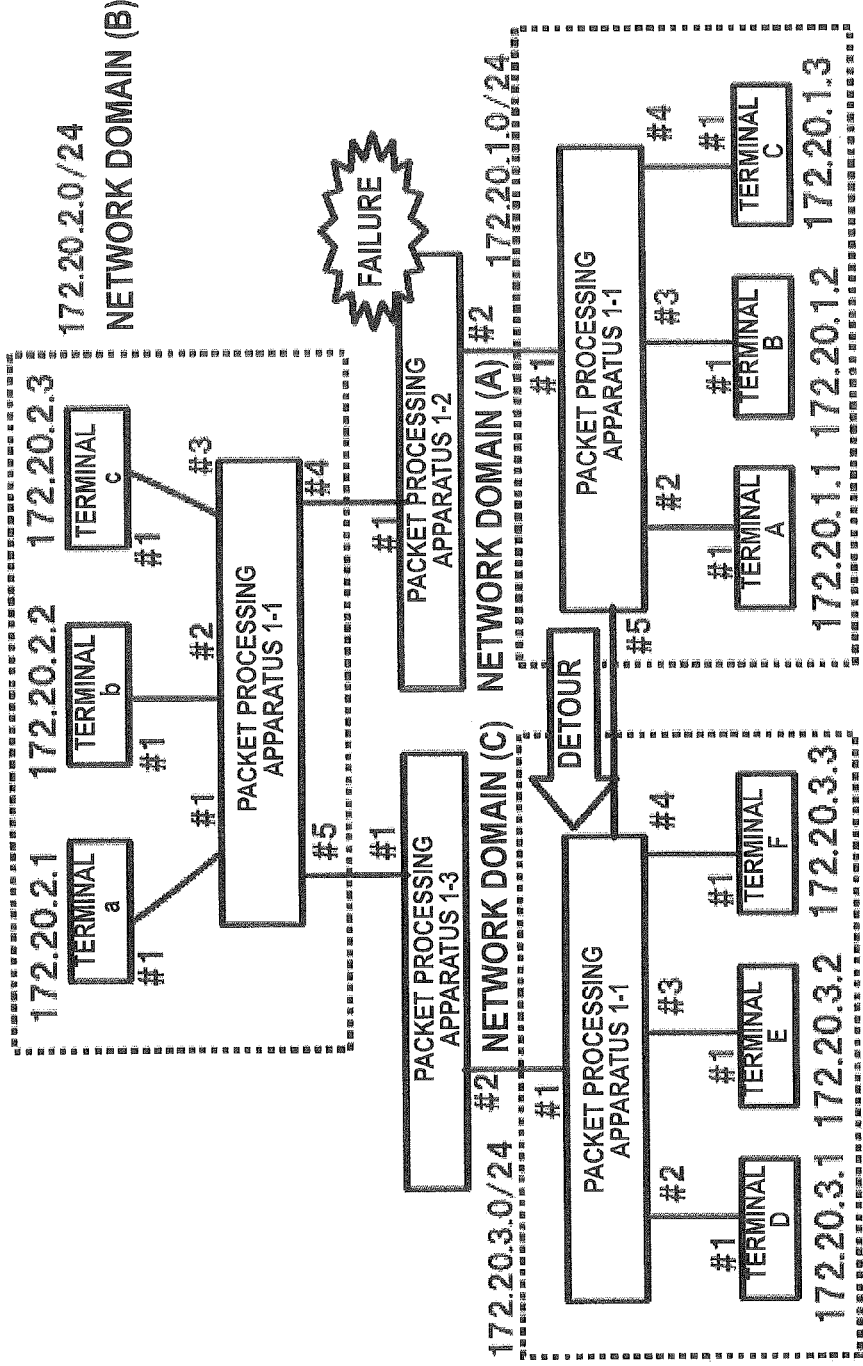
FIG. 10 illustrates a configuration of the system according to the second exemplary embodiment.

FIG. 10 illustrates an operation executed when failure is caused in a packet processing apparatus 1 connecting domains.

FIG. 10 illustrates an example in which the packet processing apparatus 1-2 connecting the domains (A) and (B) malfunctions.

When the packet processing apparatus 1-2 operates normally, packet flows from the domain (A) to the domain (B) travel through the packet processing apparatus 1-2. When failure is caused in the packet processing apparatus 1-2, packet flows transmitted from the domain (A) to the domain (B) do not travel through the packet processing apparatus 1-2. Instead, the packet flows are transmitted to the domain (B) through a packet processing apparatus 1-3.

As illustrated in FIG. 10, when the path of a packet flow is changed, processing rules set in relevant packet processing apparatuses 1 are changed.

FIG. 11 illustrates processing rules set in relevant packet processing apparatuses 1 when the path of a packet flow transmitted from the domain (A) to the domain (B) is changed. The processing rules illustrated in FIG. 11 are for processing a packet flow transmitted from the terminal B to the terminal b and a packet flow transmitted from the terminal C to the terminal c.

As illustrated in FIG. 11, processing rules for identifying packet flows based on network addresses are set in the packet processing apparatuses 1-1 in the domains (A) and (C) and the packet processing apparatus 1-3. The processing rule set in the packet processing apparatus 1-1 in the domain (B) is not changed.

Processing rules for identifying the respective packet flows may be set in an apparatus to which terminals are connected such as the packet processing apparatus 1-1 in the domain (A).

A processing rule for identifying packet flows based on network addresses is set in an apparatus arranged where packet flow paths are gathered such as a packet processing apparatus arranged on a path between domains (the packet processing apparatus 1-3 in FIG. 11).

By changing paths in accordance with a processing rule for identifying a plurality of packet flows as a group, the number of processing rules to be reset when paths are changed can be reduced.

By reducing the number of processing rules to be reset, the system requires less time for changing paths.

<Third Exemplary Embodiment>

A third exemplary embodiment illustrates an example in which the present invention is used for movement of a VM (Virtual Machine). A VM is a virtual machine configured by software that operates on a machine such as a server.

Figure 12:
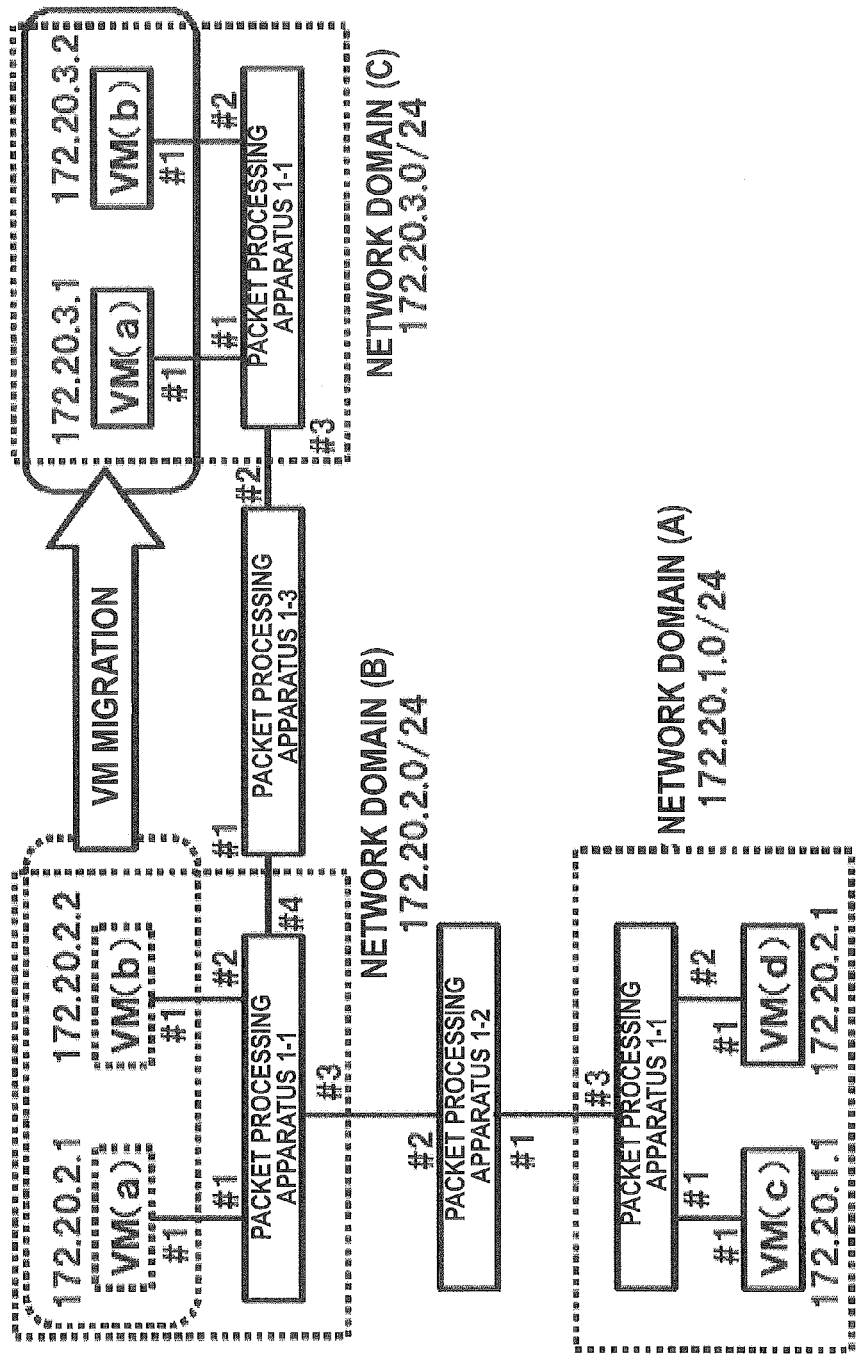
FIG. 12 illustrates a configuration of a system according to a third exemplary embodiment.

FIG. 12 illustrates a configuration of a system according to the third exemplary embodiment.

FIG. 12 illustrates an example in which a VM(a) and a VM(b) in a network domain (B) move to a network domain (C).

FIG. 13 illustrates processing rules set in packet processing apparatuses 1 before the VMs move from the domain (B) to the domain (C). FIG. 13 illustrates processing rules corresponding to a packet flow transmitted from a VM(c) to the VM(a).

A packet processing apparatus 1-2 arranged between a domain (A) and the domain (B) includes a processing rule for identifying a plurality of packet flows transmitted from the domain (A) to the domain (B) as a group. In FIG. 13, in accordance with an identification rule for identifying flows based on network addresses, the packet processing apparatus 1-2 identifies a plurality of packet flows as a group.

A packet processing apparatus 1-1 in the domain (B) processes each packet flow, in accordance with a processing rule having an identification rule for identifying a packet flow based on packet source and destination addresses.

When the VM(a) and VM(b) in the domain (B) move to the domain (C) having a different network address, the addresses of the VM(a) and VM(b) are changed. Other VMs arranged in the system are notified of such change of the addresses.

Along with the change of the addresses of the VM(a) and VM(b), processing rules set in relevant packet processing apparatuses 1 are changed.

FIG. 14 illustrates processing rules set in relevant packet processing apparatus 1 after the migration of the VMs. FIG. 14 illustrates processing rules for processing a packet flow transmitted from the VM(c) to the VM(a).

The processing rules of the packet processing apparatus 1-2 and the packet processing apparatus 1-1 in the domain (B) are changed, and a new processing rule is set in a packet processing apparatus 1-3. These processing rules are processing rules for identifying a plurality of packet flows as a group. Thus, the number of processing rules that are changed with the migration of the VMs can be reduced, and the system requires less time for completion of the migration of the VMs.

As described above, for example, a processing rule for identifying a plurality of packet flows as a group is set in a packet processing apparatus 1 arranged between a VM source communication site (a network domain, an office, a data center, etc.) and a VM destination communication site.

For example, if tens of thousands of VMs are established in a data center, processing rules relating to tens of thousands of VMs need to be changed when migration of VMs is executed. However, changing processing rules for each of the tens of thousands of VMs requires significantly large operation costs. According to the present exemplary embodiment, since the number of processing rules that need to be changed can significantly be reduced, the operation costs can greatly be reduced.

<Fourth Exemplary Embodiment>

A fourth exemplary embodiment illustrates an example in which the present invention is applied to a wireless communication network.

Figure 15:
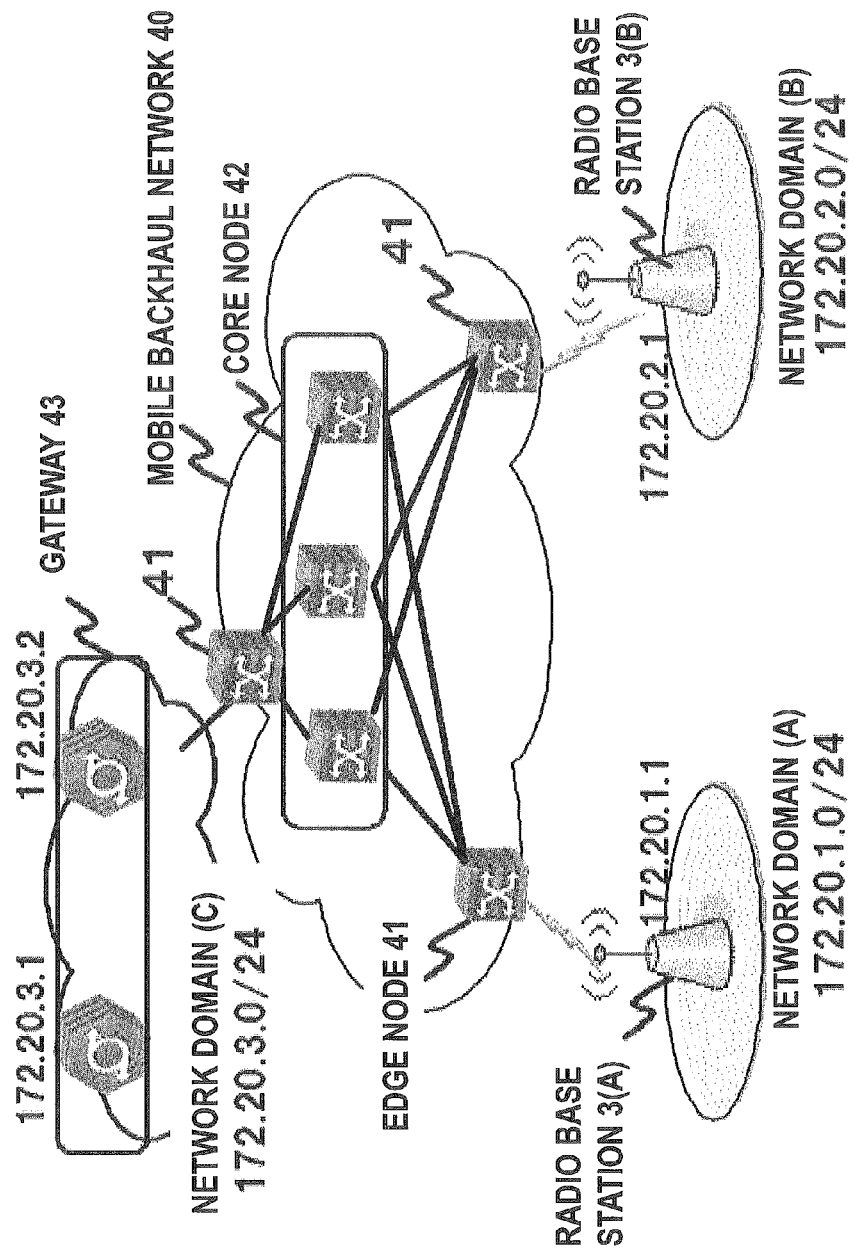
FIG. 15 illustrates a configuration of a system according to a fourth exemplary embodiment.

FIG. 15 illustrates a configuration of a system according to a fourth exemplary embodiment.

The system according to the fourth exemplary embodiment includes radio base stations 3, a mobile backhaul network 40, and a gateway 43. The mobile backhaul network 40 includes edge nodes 41 and core nodes 42. The radio base stations 3 communicate with the gateway 43 via the mobile backhaul network 40.

The radio base stations 3, the mobile backhaul network 40, and the gateway 43 are generally referred to as wireless communication sites, for example.

The edge nodes 41, the core nodes 42, and the gateway 43 have functions equivalent to those of a packet processing apparatus 1 and process packets belonging to a packet flow in accordance with a processing rule corresponding to the packet flow. The edge nodes 41, the core node 42, and the gateway 43 include functions of the packet processing apparatus 1 illustrated in FIG. 2.

Packet flows transmitted between a radio base station 3 and the gateway 43 are gathered at a relevant core node 42. Thus, the fourth exemplary embodiment illustrates an example in which each core node 42 includes a processing rule for identifying a plurality of packet flows as a group. A processing rule for identifying a plurality of packet flows as a group may be set in an edge node 41.

FIG. 16 illustrates processing rules set in a core node 42. Processing rules, each of which identifies a packet flow between a radio base station 3 and the gateway 43 based on network addresses, are set in the core node 42. In addition, processing rules for identifying packet flows between radio base stations 3(A) and 3(B) based on network addresses are set in the core node 42.

<Fifth Exemplary Embodiment>

A fifth exemplary embodiment illustrates an example in which the present invention is applied to a mobile network.

Figure 17:
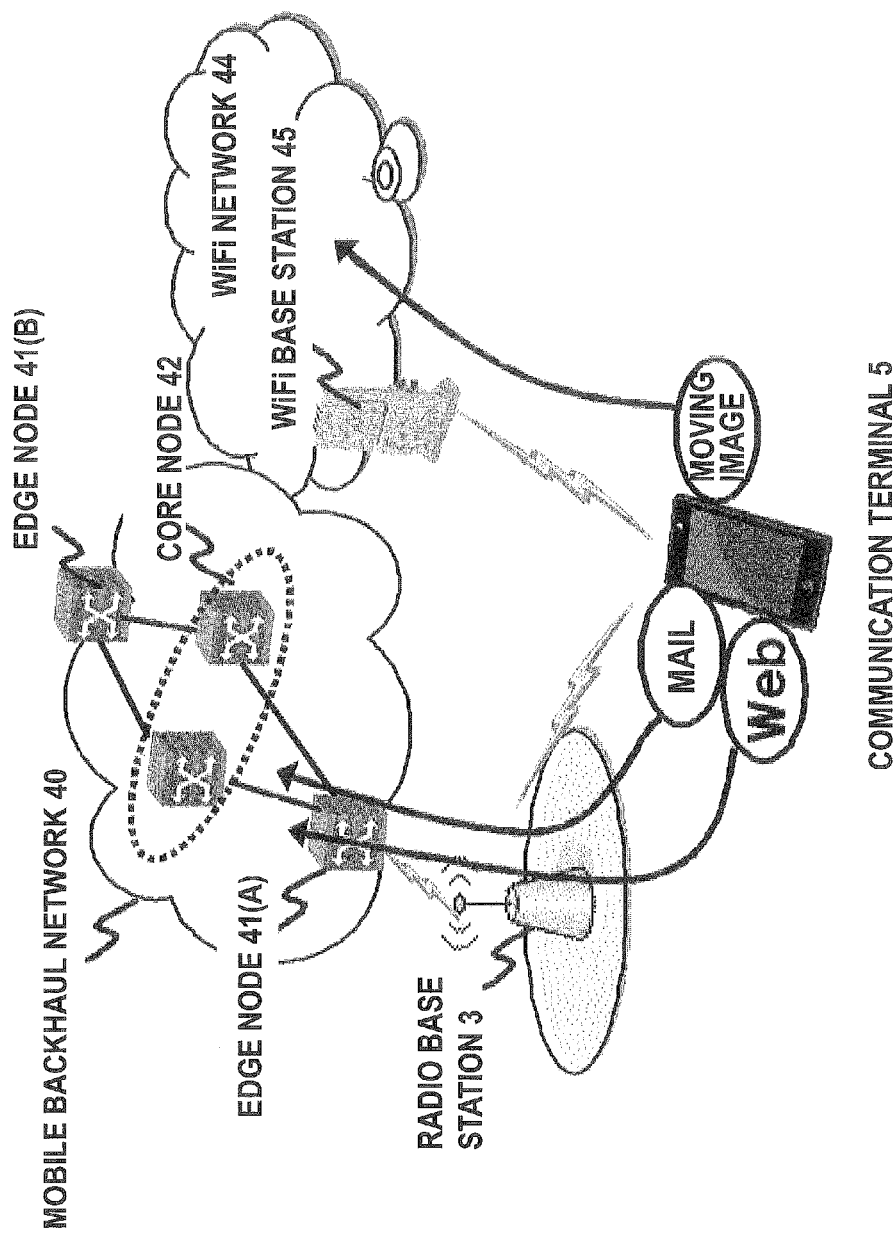
FIG. 17 illustrates a configuration of a system according to a fifth exemplary embodiment.

FIG. 17 illustrates a configuration of a system according to the fifth exemplary embodiment.

A communication terminal 5 includes a plurality of communication interfaces. For example, the communication terminal 5 includes a communication interface for executing communication based on communication standards such as 3G (3rd Generation) or LTE (Long Term Evolution) and a communication interface for communicating with a WLAN (Wireless Local Area Network) network such as a wireless LAN or WiFi (Wireless Fidelity).

The communication terminal 5 includes a function of changing communication interfaces that are used, depending on an application or communication type. For example, the communication terminal 5 is connected to a radio base station 3 via an LTE communication interface, to execute communication such as telephoning, mailing, Web accessing, or the like. A user can browse a moving image on the communication terminal 5 via a WiFi network 44, for example. When communicating with the WiFi network 44, the communication terminal 5 is connected to a WiFi base station 45.

Figure 18:
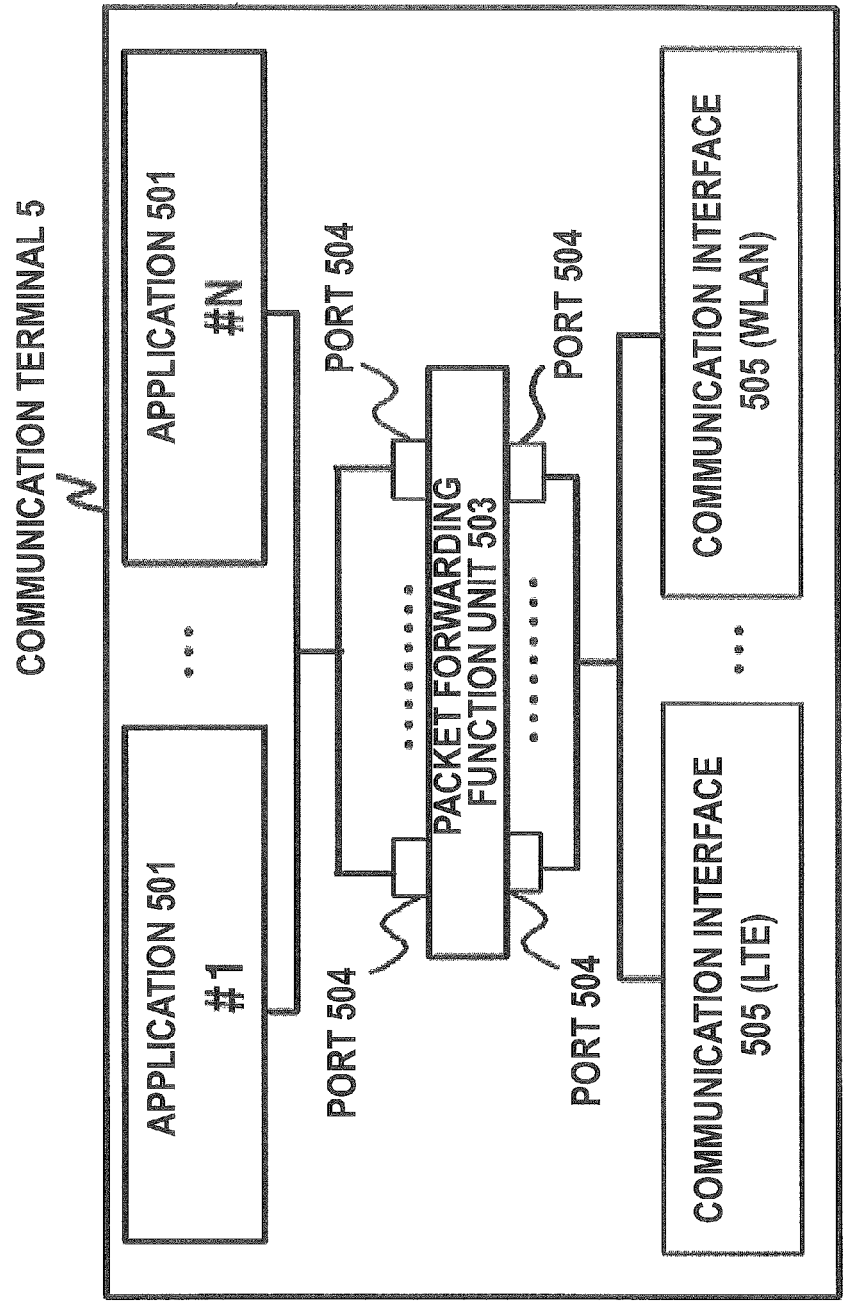
FIG. 18 illustrates a configuration of a communication terminal.

FIG. 18 illustrates a configuration of the communication terminal 5.

The communication terminal 5 includes a plurality of communication interfaces 505. The communication terminal 5 includes a function of executing a plurality of applications 501. A packet forwarding function unit 503 includes a function of changing communication interfaces 505 on the basis of a type of an application 501. In addition, the packet forwarding function unit 503 includes functions equivalent to those of a packet processing apparatus 1 according to the above exemplary embodiments.

The packet forwarding function unit 503 includes a plurality of ports 504, each of which corresponds to one of the communication interfaces 505, for example. The packet forwarding function unit 503 includes a function of associating each application 501 with one of the communication interfaces 505.

For example, the packet forwarding function unit 503 forwards a packet, which has been transmitted from an application 501 executing Web access, from a port 504 corresponding to a communication interface 505 for executing communication with an LTE network. The packet forwarded is transmitted to the LTE network via the communication interface 505.

For example, the packet forwarding function unit 503 identifies which application 501 corresponds to a packet transmitted from the communication interface corresponding to the LTE network and forwards the packet to a corresponding application 501.

For example, the packet forwarding function unit 503 identifies an application type based on a packet port number. If the packet port number is "80," the packet forwarding function unit 503 determines that the application type is Web access based on HTTP (Hypertext Transfer Protocol).

The packet forwarding function unit 503 executes the above operation in accordance with processing rules.

FIG. 19 illustrates processing rules set in the packet forwarding function unit 503. FIG. 19 illustrates three processing rules.

For example, if a packet is inputted via port number "80" and is addressed to an arbitrary external address (the destination address is a wildcard), the packet forwarding function unit 503 forwards the packet from a port 504 corresponding to a communication interface 505 for executing communication with an LTE network.

For example, if the packet forwarding function unit 503 receives a packet via port number "143," since the packet relates to mail reception based on the IMAP protocol, the packet forwarding function unit 503 forwards the packet to a mail application 501.

For example, if the packet forwarding function unit 503 receives a packet via port number "80" and the destination is the address of the communication terminal 5, the packet forwarding function unit 503 forwards the packet to a port 504 corresponding to a Web application 501.

In FIG. 19, a plurality of processing rules are set in the packet forwarding function unit 503, and each of the processing rules is set for a packet flow identified based on an application type. However, if processing rules are set in all the communication apparatuses on a communication path on a per-packet-flow basis, a very large number of processing rules needs to be set in each apparatus.

Thus, as illustrated in FIG. 20, by setting processing rules for identifying a plurality of packet flows as a group in some of the communication apparatuses, the number of processing rules can be reduced.

According to the fifth exemplary embodiment, for example, processing rules for identifying a plurality of packet flows as a group are set in the edge nodes 41(A) in the mobile backhaul network 40. These processing rules may be set in the core nodes 42 and communication apparatuses on the WiFi network 44.

The edge nodes 41(A) process packet flows exchanged with the communication terminal 5, in accordance with the processing rules illustrated in FIG. 20.

The edge nodes 41(A) forward a packet, whose application type represents Web or mail and which is transmitted from the communication terminal 5, to an Internet network or the like via a predetermined port.

The edge nodes 41(A) forward a packet, whose application type represents Web or mail and which is addressed to the communication terminal 5, to the communication terminal 5 via a predetermined port.

While the communication terminal 5 executing wireless communication is illustrated in the fifth exemplary embodiment, the communication terminal 5 may be an apparatus executing wired communication such as a server or a PC (Personal Computer).

<Sixth Exemplary Embodiment>

A sixth exemplary embodiment illustrates a processing rule for identifying a plurality of packet flows as a group based on an identifier.

The sixth exemplary embodiment can be applied to any one of the above exemplary embodiments.

FIG. 21 illustrates a configuration and an outline of a system according to the sixth exemplary embodiment.

A packet flow from a terminal b to a terminal c or a terminal d is transmitted via a packet processing apparatus 1-2. In FIG. 21, a packet flow from the terminal b to the terminal d will be referred to as flow A and a packet flow from the terminal b to the terminal c will be referred to as flow B.

The packet processing apparatus 1-2 processes a packet flow based on an identifier (identifier X) that is used to identify flows A and B as a group, for example.

FIG. 22 illustrates processing rules set in relevant packet processing apparatuses 1.

A packet processing apparatus 1-1 adds the identifier X to a packet belonging to flow A and forwards this packet including the identifier from port 3. In addition, the packet processing apparatus 1-1 adds the identifier X to a packet belonging to flow B and forwards this packet including the identifier from port 3. The packet processing apparatus 1-1 encapsulates a packet belonging to flow A or B with the identifier X. The packet header may be provided with a new region for storing the identifier.

For flows A and B, processing rules for adding the identifier X and forwarding the packet are set in the packet processing apparatus 1-1. Alternatively, a processing rule in which these rules are integrated may be set. For example, a processing rule including an identification rule representing that "the source is the terminal b and the destination is the terminal c or d" may be set in the packet processing apparatus 1-1.

When receiving a packet including the identifier X, the packet processing apparatus 1-2 forwards the packet from port 2. By using the identifier X, flows A and B can be identified as a group. Thus, the number of processing rules set in the packet processing apparatus 1-2 can be reduced.

A packet processing apparatus 1-3 deletes the identifier X added to a packet belonging to flow A and forwards the packet from port 2. In addition, the packet processing apparatus 1-3 deletes the identifier X added to a packet belonging to flow B and forwards the packet from port 1. By deleting the identifier X, the packet processing apparatus 1-3 decapsulates the packet.

FIG. 23 illustrates other examples of processing rules set in the packet processing apparatuses 1.

Processing rules in FIG. 23 define a processing method indicating that a predetermined region of a packet (for example, the source MAC (Media Access Control) address) is to be rewritten to the identifier X.

In accordance with this processing rule, the packet processing apparatus 1-1 rewrites a predetermined region of a packet belonging to flow A or B to the identifier X and forwards the packet from a predetermined port.

If the identifier X is included in a region of a packet, the packet processing apparatus 1-2 determines that the packet belongs to flow A or B and processes the packet in accordance with a method defined in the corresponding processing rule.

The packet processing apparatus 1-3 recovers the predetermined region of the packet belonging to flow A or B to the original content.

To recover the packet, the region in which the content of the packet has been rewritten and the original content are previously set in the packet processing apparatus 1-3.

According to the sixth exemplary embodiment, since a packet processing apparatus uses a processing rule for identifying a plurality of packet flows as a group based on an identifier, the number of processing rules is reduced. In addition, even if a flow cannot be identified based on network addresses, the number of processing rules set in a packet processing apparatus can be reduced.

<Seventh Exemplary Embodiment>

A seventh exemplary embodiment illustrates an example in which processing rules set in packet processing apparatuses 1 are managed in a centralized manner.

The seventh exemplary embodiment can be applied to any one of the above exemplary embodiments.

Figure 24:
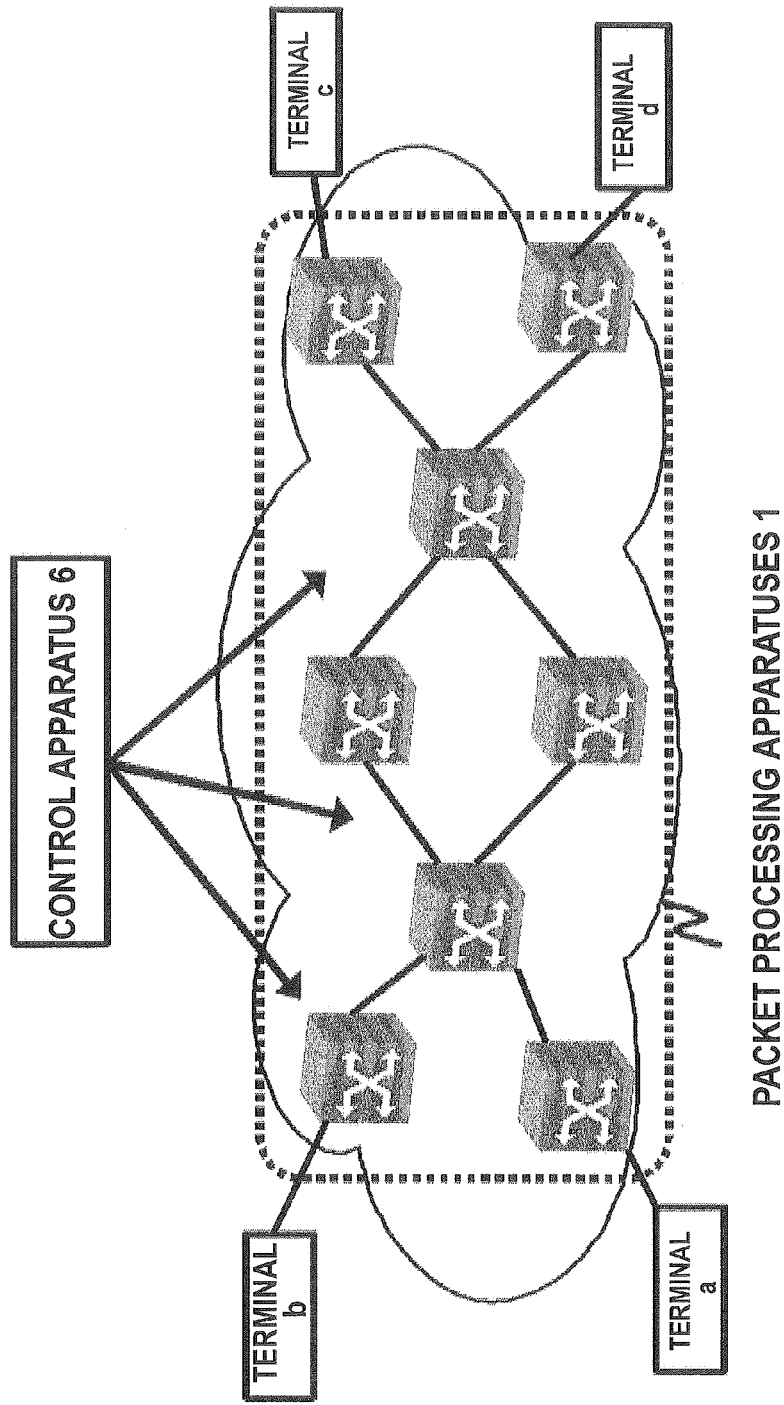
FIG. 24 illustrates a configuration of a system according to a seventh exemplary embodiment.

FIG. 24 illustrates a configuration of a system according to the seventh exemplary embodiment.

A network in the system is configured by a plurality of packet processing apparatuses 1. Terminals a to d are connected to packet processing apparatuses 1 that are located at edges of the network.

A control apparatus 6 sets processing rules in the packet processing apparatuses 1. For example, the control apparatus 6 is configured by an information processing apparatus such as a server.

Figure 25:
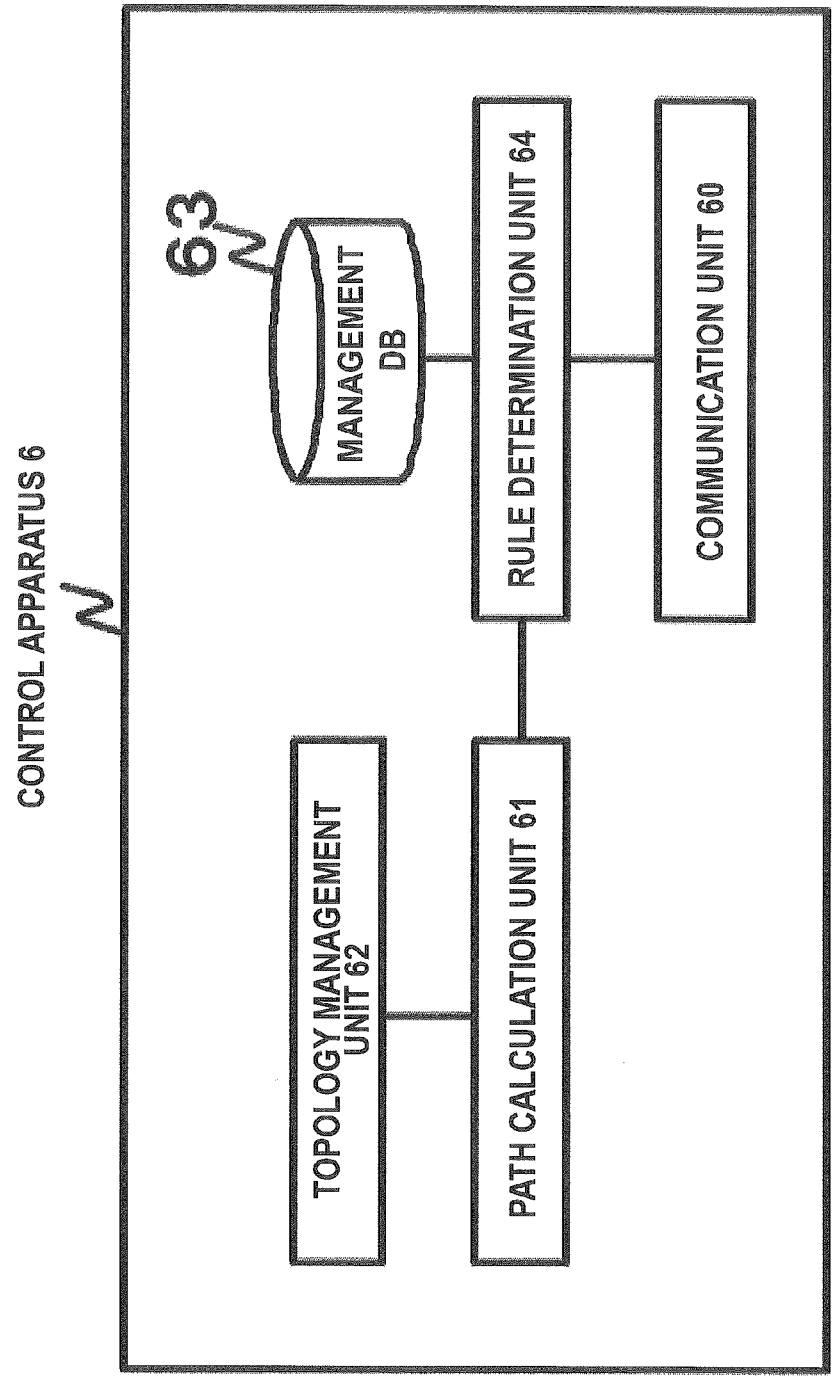
FIG. 25 illustrates a configuration of a control apparatus.

FIG. 25 illustrates a configuration of the control apparatus 6.

The control apparatus 6 includes a communication unit 60, a path calculation unit 61, a topology management unit 62, a management DB 63, and a rule determination unit 64. The control apparatus 6 may be configured by software such as an OS (Operating System) that operates on a server.

The communication unit 60 communicates with the processing rule setting unit 10 of the packet processing apparatus 1 illustrated in FIG. 2 and sets processing rules in the packet processing apparatus 1. In addition, the communication unit 60 may communicate with the communication terminal 5 illustrate in FIG. 18 and set processing rules in the packet forwarding function unit 503.

For example, the topology management unit 62 collects information about a connection relationship among the packet processing apparatuses 1 from a packet processing apparatus 1 and manages a network topology configured by the packet processing apparatuses 1. For example, the topology management unit 62 uses the LLDP (Link Layer Discovery Protocol) to manage the network topology. The packet processing apparatuses 1 use the LLDP to exchange information with apparatuses adjacent thereto on the network. By exchanging information with such adjacent apparatuses based on the LLDP, the packet processing apparatuses 1 collect reachability with respect to the adjacent apparatuses and information about the connected apparatuses. The packet processing apparatuses 1 transmit such collected information to the topology management unit 62. Based on the information transmitted from the packet processing apparatuses 1, the topology management unit 62 manages the network topology.

The path calculation unit 61 determines a path for forwarding a packet flow, based on the topology information included in the topology management unit 62. The path calculation unit 61 calculates a path for forwarding a packet flow from the terminal a to the terminal c in FIG. 24, for example.

The rule determination unit 64 determines processing rules to be set in the packet processing apparatuses 1 on a forwarding path calculated by the path calculation unit 61. The rule determination unit 64 determines a processing rule, in accordance with at least one of the methods described in the above exemplary embodiments. The rule determination unit 64 determines a packet processing apparatus that sets a processing rule for identifying each of a plurality of packet flows and a packet processing apparatus that sets a processing rule for identifying a plurality of packet flows as a group, among the packet processing apparatuses 1 that exist on the forwarding path.

For example, the rule determination unit 64 sets a processing rule for identifying a plurality of packet flows as a group in a packet processing apparatus 1 where a plurality of packet flows are gathered. A plurality of packet flows are gathered at a packet processing apparatus 1 where all of a plurality of packet flows commonly travel. Thus, for example, the rule determination unit 64 sets a processing rule for identifying a plurality of packet flows as a group in a packet processing apparatus 1 where a plurality of packet flows commonly travel.

For example, the rule determination unit 64 sets processing rules for identifying a plurality of packet flows individually in the packet processing apparatuses 1 located at the edges to which the terminals are connected. For example, the rule determination unit 64 sets a processing rule for identifying a plurality of packet flows as a group in the packet processing apparatuses 1 located inside the network. The rule determination unit 64 changes the processing rule granularity depending on the types of the nodes (the edge nodes and the core nodes). Thus, the rule determination unit 64 can reduce the number of processing rules set in the core nodes. An operator of the system may be allowed to operate the rule determination unit 64 of the control apparatus 6, determine a processing rule, and set the determined processing rule in a packet processing apparatus 1.

The rule determination unit 64 may determine a processing rule in response to a processing rule setting request from a packet processing apparatus 1. For example, when the processing rule setting unit 10 of a packet processing apparatus 1 receives an unknown packet belonging to a new packet flow for which a corresponding processing rule does not exist, the processing rule setting unit 10 may request the control apparatus 6 to set a processing rule. For example, when a processing method indicating a query to the control apparatus 6 is defined in a processing rule that a packet matches, the processing rule setting unit 10 of a packet processing apparatus 1 may give a request to the control apparatus 6.

When a new VM is generated and a new packet flow relating to the VM is caused, the rule determination unit 64 may determine a processing rule relating to the new packet flow.

When setting the processing rules illustrated in FIG. 23, the rule determination unit 64 may notify a packet processing apparatus of information for recovering a packet having a predetermined region converted to the identifier X (the content before the conversion and the converted region).

The rule determination unit 64 may monitor the packet processing apparatuses 1 managed by the control apparatus 6 and collect statuses of the packet processing apparatuses 1 (a failure status, a congestion status, etc.). For example, when detecting failure in a packet processing apparatus 1, the rule determination unit 64 determines a processing rule relating to change of a path in accordance with the examples as illustrated in the second or third exemplary embodiment. For example, when detecting congestion in a packet processing apparatus 1, the rule determination unit 64 determines a processing rule relating to change of a path as illustrated in the second or third exemplary embodiment. The statuses collected by the rule determination unit 64 are not limited to those relating to failure and congestion.

The rule determination unit 64 may monitor a virtual machine (VM) connected to a packet processing apparatus 1 managed by the control apparatus 6. For example, when a virtual machine is moved to a different communication site (a network domain, an office, a data center, etc.), the rule determination unit 64 determines a processing rule relating to change of a path, which is caused along with the movement of the virtual machine, in accordance with the example as illustrated in the third exemplary embodiment.

For example, the rule determination unit 64 determines a communication interface 505 for each of the applications 501 used by the communication terminal 5. The rule determination unit 64 determines a processing rule to be set in the communication terminal 5, based on a correspondence relationship between an application 501 and a communication interface 505. For example, the rule determination unit 64 sets the processing rules illustrated in FIG. 19 in the communication terminal 5.

The rule determination unit 64 stores the determined processing rules in the management DB (Database) 63.

According to the seventh exemplary embodiment, the control apparatus 6 can manage the processing rules set in the packet processing apparatuses 1 in a centralized manner. As a result, operation and management costs relating to setting the processing rules can significantly be reduced.

The control apparatus 6 and the packet processing apparatuses 1 may be configured to operate in accordance with a protocol referred to as OpenFlow.

In OpenFlow, communication apparatuses such as switches and routers process packet flows in accordance with information corresponding to processing rules of the present invention, that is, in accordance with flow entries. A flow entry has a function of collecting statistical information corresponding to the amount of packets processed in the flow entry. In OpenFlow, while the statistical information can be collected per packet flow, a function of gathering and collecting statistical information about a plurality of packet flows is not provided.

By using the present invention, a communication apparatus can use a flow entry that can identify a plurality of packet flows as a group. Thus, the communication apparatus can collect statistical information in which processing amounts of a plurality of packet flows are gathered.

<Eighth Exemplary Embodiment>

An eighth exemplary embodiment illustrates a system in which packet processing apparatuses 1 managed by a control apparatus 6 and packet processing apparatuses 100 independent of the control apparatus 6 coexist.

The eighth exemplary embodiment can be applied to any one of the above exemplary embodiments.

Figure 26:
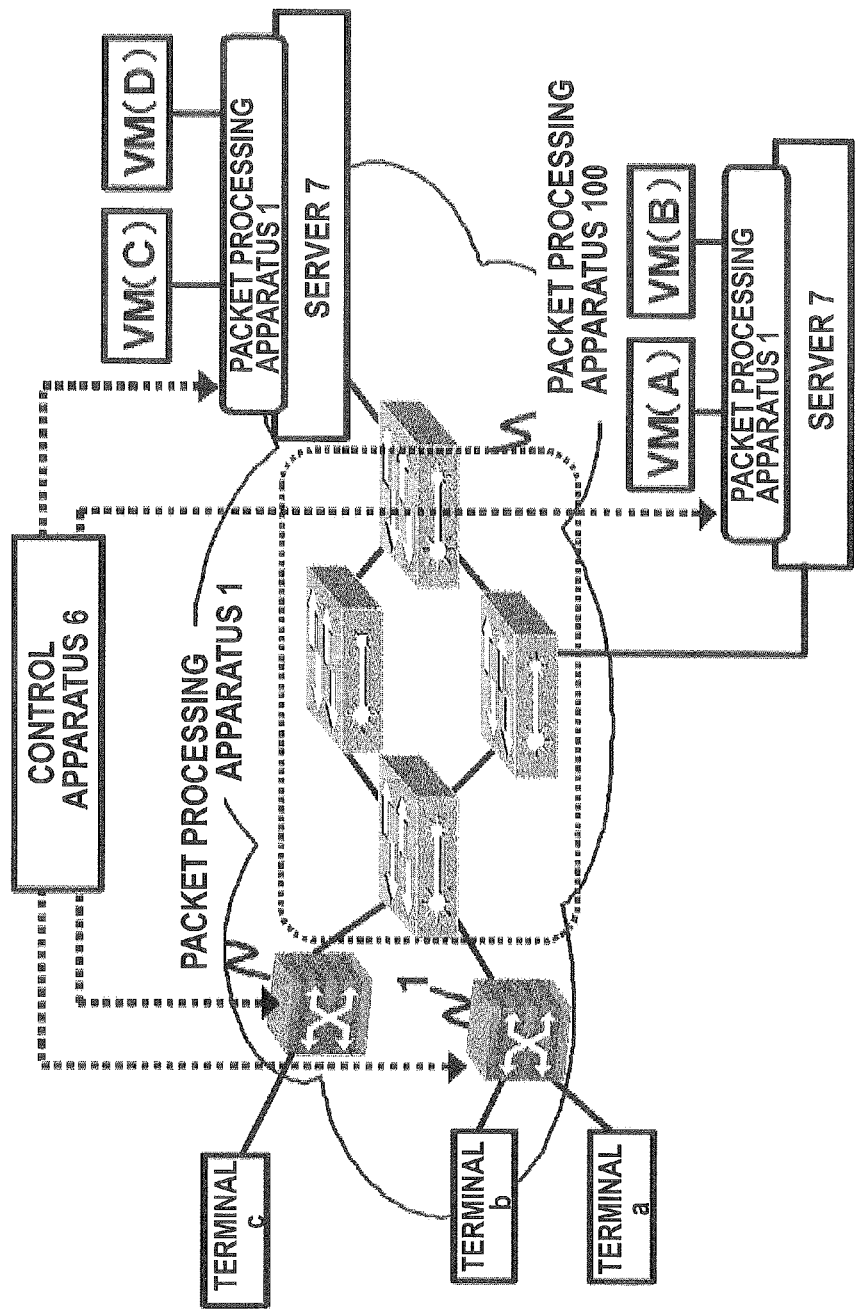
FIG. 26 illustrates a configuration of a system according to an eighth exemplary embodiment.

FIG. 26 illustrates a configuration of a system according to the eighth exemplary embodiment.

The control apparatus 6 manages the packet processing apparatuses 1 located at edges of a network. The packet processing apparatuses 100 located inside (in the core of) the network are independent of the control apparatus 6.

The packet processing apparatuses 1 may be virtual switches configured by software that operates on servers 7. For example, each packet processing apparatus 1 that operates as a virtual switch communicates with a virtual machine (VM) established on a server 7. Each server 7 is located at an edge of the network, for example. The control apparatus 6 controls these packet processing apparatuses 1 that operate on the respective servers 7 located at the edges.

The control apparatus 6 includes functions equivalent to those described in the seventh exemplary embodiment. The control apparatus 6 determines a processing rule, in accordance with at least one of the methods described in the above exemplary embodiments. The control apparatus 6 sets processing rules in the packet processing apparatuses 1. In addition, the control apparatus 6 may set processing rules in the communication terminal 5 according to the fifth exemplary embodiment.

In addition, for example, the control apparatus 6 may include a function of establishing a new virtual machine (VM) on a server 7.

For example, when a new VM is generated on a server 7, the control apparatus 6 determines a processing rule corresponding to a packet flow relating to the established VM. When a new VM is generated, a new packet flow is generated from the VM. Thus, the control apparatus 6 determines a processing rule, in response to occurrence of such new packet flow. Alternatively, an operator of the system may operate the rule determination unit 64 of the control apparatus 6, establish a new VM, and determine a processing rule corresponding to the VM.

Setting processing rules in the packet processing apparatuses 100 is executed independently of the control apparatus 6. For example, by using a console for setting apparatuses, an operator sets processing rules in the packet processing apparatuses 100. Alternatively, for example, a management apparatus other than the control apparatus 6 may set processing rules in the packet processing apparatuses 100. Setting processing rules in the packet processing apparatuses 100 is not limited to the above methods.

Figure 27:
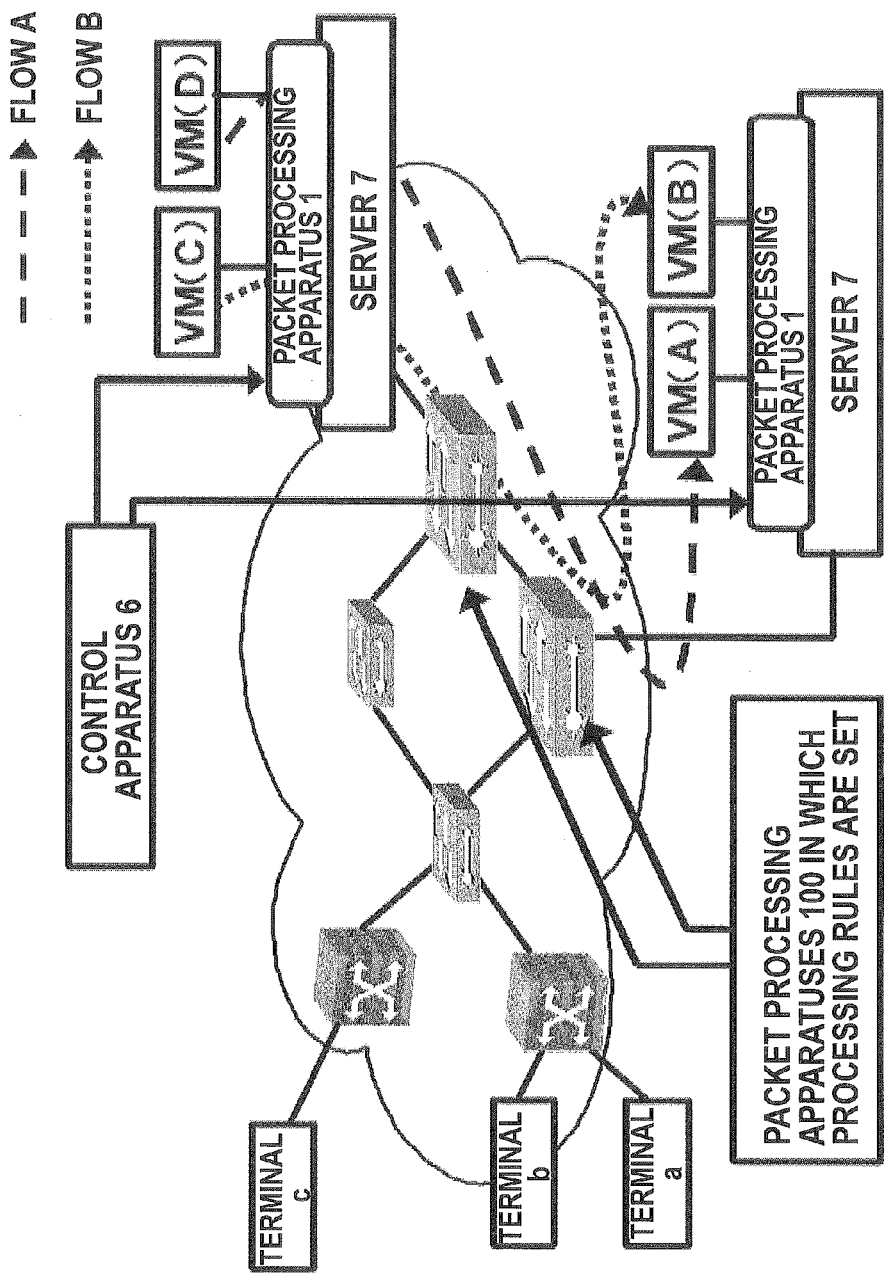
FIG. 27 illustrates an operation according to the eighth exemplary embodiment.

FIGS. 27 and 28 illustrate an example in which the method described in the sixth exemplary embodiment is used as a method for setting processing rules in the packet processing apparatuses 1 and 100. The method for setting processing rules in the packet processing apparatuses 1 and 100 is not limited to the method illustrated in FIGS. 27 and 28.

In FIG. 27, a packet flow from a VM(D) to a VM(A) will be referred to as flow A and a packet flow from a VM(C) to the VM(B) as flow B. The control apparatus 6 sets processing rules in the packet processing apparatus 1 connected to the VM(C) and the VM(D) and in the packet processing apparatus 1 connected to the VM(A) and a VM(B). As illustrated in FIG. 27, processing rules are set in packet processing apparatuses 100 on paths of flows A and B.

FIG. 28 illustrates processing rules set in the relevant packet processing apparatuses.

Processing rules for identifying flows A and B individually are set in the packet processing apparatus 1 connected to the VM(C) and the VM(D). In accordance with each of the processing rules, the packet processing apparatus 1 adds the identifier X to packets belonging to flow A or B and forwards the packets to a core node (packet forwarding apparatus 100).

A processing rule for identifying flows A and B as a group based on the identifier X is set in the packet processing apparatus 100. Since a plurality of packet flows can be identified as a group, the number of processing rules set in the core node can be reduced.

The processing rule for identifying packet flows as a group based on the identifier may previously be set in the packet processing apparatus 100. It is assumed that a forwarding path between packet processing apparatuses 1, each of which is arranged at an edge of the network, is previously set by the path calculation unit 61 of the control apparatus 6. For example, it is assumed that a forwarding path between a packet processing apparatus 1 connected to a terminal a and a packet processing apparatus 1 connected to a terminal c is previously set by the control apparatus 6. In addition, the rule determination unit 64 of the control apparatus 6 determines and manages an identifier corresponding to each forwarding path. For example, based on a correspondence relationship between a forwarding path and an identifier, an operator of the system sets a processing rule for identifying flows based on an identifier corresponding to the forwarding path in the packet processing apparatuses 100 arranged along the forwarding path. For example, if the identifier corresponding to a forwarding path between the packet processing apparatus 1 connected to the terminal a and the packet processing apparatus 1 connected to the terminal c is "Y," an operator sets a processing rule for identifying flows based on the identifier Y in the packet processing apparatuses 100 arranged along the forwarding path.

If a forwarding path is previously determined between edge nodes as described above, packet flows between terminals or VMs connected to such edge nodes travel along the forwarding path. Thus, the control apparatus 6 can determine that a plurality of packet flows traveling along the same forwarding path between edge nodes are gathered to the same forwarding path. For example, the control apparatus 6 sets, in a packet processing apparatus 1 located at a start point of a forwarding path between edge nodes, a processing rule for adding an identifier corresponding to the forwarding path to packets belonging to a plurality of packet flows traveling along the forwarding path. In addition, for example, the control apparatus 6 sets, in a packet processing apparatus 1 located at an end point of the forwarding path between the edge nodes, a processing rule for deleting the identifier added to the packets belonging to the plurality of packet flows traveling along the forwarding path. As described above, since processing rules for processing packet flows based on an identifier are previously set in the packet processing apparatuses 100 located along a forwarding path between edge nodes, flows between the edge nodes are processed by the packet processing apparatuses 100. The control apparatus 6 includes a function of determining, when a new VM is generated, a forwarding path for a new packet flow relating to the VM and determining an identifier corresponding to the determined path. The control apparatus 6 allocates the determined identifier to the new packet flow.

Each packet processing apparatus 100 forwards packets including the identifier X to a port defined in the processing rule.

Processing rules for identifying flows A and B individually are set in the packet processing apparatus 1 connected to the VM(A) and VM(B). In accordance with each processing rule, the packet processing apparatus 1 deletes the identifier X added to the packets belonging to flow A or B and forwards the packets to the VM(A) or VM(B).

To cause the control apparatus 6 to set processing rules, a system operator needs to arrange packet processing apparatuses having interfaces that can communicate with the control apparatus 6 in the network. However, large costs are required to replace many communication apparatuses arranged in the network with such apparatuses that can communicate with the control apparatus 6.

According to the eighth exemplary embodiment, an advantageous effect can be obtained as long as communication apparatuses located at edges of the network are replaced with the packet processing apparatuses 1 that can communicate with the control apparatus 6. Namely, the eighth exemplary embodiment has an advantageous effect of easily installing a system in which the control apparatus 6 can manage processing rules.

While exemplary embodiments of the present invention have thus been described, the present invention is not limited thereto. The present invention can be achieved based on a variation, a substitution, or an adjustment of any one of the exemplary embodiments. In addition, the present invention can be achieved by arbitrarily combining the exemplary embodiments. Namely, the present invention includes various variations and modifications that can be achieved in accordance with the entire disclosure of the contents and technical concepts in the description. Particularly, any numerical range disclosed herein should be interpreted that any intermediate values or subranges falling within the disclosed range are also concretely disclosed even without specific recital thereof.

1 packet processing apparatus
10 processing rule setting unit
11 storage unit
12 packet processing unit
2 setting apparatus
3 radio base station
40 mobile backhaul network
41 edge node
42 core node
43 gateway
44 WiFi network
45 WiFi base station
5 communication terminal
501 application
503 packet transfer function unit
504 port
505 communication interface
6 control apparatus
60 communication unit
61 path calculation unit
62 topology management unit
63 management DB
64 rule determination unit
7 server

What is claimed is:

1. A communication method for identifying packet flows based on predetermined rules and processing packets belonging to identified packet flows, the communication method comprising:
setting, by a setting apparatus, in two first nodes, a plurality of first rules that identify a plurality of packet flows, respectively; and
setting, in a second node, arranged between the two first nodes, a second rule that identifies the plurality of packet flows as a group,
wherein the plurality of packet flows are flows between the two first nodes via the second node, and
when the first and second nodes receive an unknown packet, the first and second nodes request the setting apparatus to set the corresponding first or second rule, and
first nodes process a received packet based on the set first rule, and the second node processes a received packet belonging to one of the plurality of packet flows based on the set second rule.

2. The communication method according to claim 1, further comprising:
setting the plurality of first rules, each of which includes a first identification rule that identifies at least one of the plurality of packet flows; and
setting the second rule that includes a second identification rule that encompasses the plurality of first identification rules included in the plurality of first rules.

3. The communication method according to claim 1, further comprising:
setting in the second node the second rule that defines a common processing method for packets belonging to the plurality of packet flows.

4. The communication method according to claim 1, further comprising:
setting the second rule that identifies the plurality of packet flows based on an identifier corresponding to the group.

5. The communication method according to claim 1, wherein a plurality of packet flows transmitted between a first network domain and a second network domain are identified by the second rule.

6. The communication method according to claim 1, wherein a plurality of packet flows transmitted between a first communication site and a second communication site are identified by the second rule.

7. The communication method according to claim 1, wherein a plurality of packet flows transmitted between a first wireless communication site and a second wireless communication site are identified by the second rule.

8. The communication method according to claim 1, wherein a plurality of packet flows transmitted between a wireless communication site and a backhaul network are identified by the second rule.

9. The communication method according to claim 1, further comprising:
by a control apparatus controlling the first nodes, setting the plurality of first rules in the first node.

10. A communication system for identifying packet flows based on predetermined rules and processing packets belonging to identified packet flows, the communication system comprising:
a setting apparatus;
two first nodes; and
a second node arranged between the two first nodes,
wherein the setting apparatus comprises:
a first unit that sets, in the two first nodes, a plurality of first rules that identify a plurality of packet flows, respectively; and
a second unit that sets, in the second node, a second rule that identifies the plurality of packet flows as a group, and
wherein the plurality of packet flows are flows between the two first nodes via the second node, and
when the first nodes and second nodes receive an unknown packet, the first and second nodes request the setting apparatus to set the corresponding first or second rule, and
first nodes process a received packet based on the set first rule, and the second node processes a received packet belonging to one of the plurality of packet flows based on the set second rule.

11. The communication system according to claim 10, wherein
the first unit sets the plurality of first rules, each of which includes a first identification rule that identifies at least one of the plurality of packet flows, and
the second unit sets the second rule that includes a second identification rule that encompasses the plurality of first identification rules included in the plurality of first rules.

12. The communication system according to claim 10, wherein the second unit sets in the second node the second rule that defines a common processing method for packets belonging to the plurality of packet flows.

13. The communication system according to claims 10, wherein the second unit sets the second rule that identifies the plurality of packet flows based on an identifier corresponding to the group.

14. The communication system according to claims 10, wherein the second unit determines, as the plurality of packet flows identified by the second rule, a plurality of packet flows transmitted between a first network domain and a second network domain.

15. The communication system according claim 10, wherein the second unit determines, as the plurality of packet flows identified by the second rule, a plurality of packet flows transmitted between a first communication site and a second communication site.

16. The communication system according to claim 10, wherein the second unit determines, as the plurality of packet flows identified by the second rule, a plurality of packet flows transmitted between a first wireless communication site and a second wireless communication site.

17. The communication system according to claim 10, wherein the second unit determines, as the plurality of packet flows identified by the second rule, a plurality of packet flows transmitted between a wireless communication site and a backhaul network.

18. The communication system according to claim 10, further comprising:
    a control apparatus that controls the first node,
    wherein the control apparatus sets the plurality of first rules in the first node.

19. A communication terminal identifying packet flows based on predetermined rules and processing packets belonging to identified packet flows, the communication terminal comprising:

a first unit that receives from a setting apparatus a plurality of first rules that identify a plurality of packet flows, respectively; and a second unit that transmits in accordance with the first rules a packet to a second node, in which a second rule that identifies the plurality of packet flows as a group is set from the setting apparatus, wherein:
   the communication terminal comprises one of two nodes receiving the plurality of first rules,
   the second node is arranged between the two nodes receiving the plurality of first rules, and
the plurality of packet flows are flows between the two nodes via the second node, and
when the one node and the second node receive an unknown packet, the one and second nodes request the setting apparatus to set the corresponding first or second rule, and
the one node processes a received packet based on the set first rule, and the second node processes a received packet belonging to one of the plurality of packet flows based on the set second rule.

\* \* \* \* \*